(12) United States Patent
Iwami

(10) Patent No.: US 9,483,149 B2
(45) Date of Patent: Nov. 1, 2016

(54) CONDUCTIVE FILM, DISPLAY DEVICE AND TOUCH PANEL COMPRISING SAME, AND CONDUCTIVE FILM PATTERN DETERMINATION METHOD

(71) Applicant: FUJIFILM Corporation, Tokyo (JP)

(72) Inventor: Kazuchika Iwami, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 63 days.

(21) Appl. No.: 14/639,070

(22) Filed: Mar. 4, 2015

(65) Prior Publication Data

US 2015/0185925 A1    Jul. 2, 2015

Related U.S. Application Data

(63) Continuation of application No. PCT/JP2013/073130, filed on Aug. 29, 2013.

(30) Foreign Application Priority Data

Sep. 7, 2012  (JP) ................. 2012-197815

(51) Int. Cl.
*G06F 3/041*    (2006.01)
*G06F 3/044*    (2006.01)

(52) U.S. Cl.
CPC ..... *G06F 3/044* (2013.01); *G06F 2203/04112* (2013.01)

(58) Field of Classification Search
None
See application file for complete search history.

(56) References Cited

U.S. PATENT DOCUMENTS 5,675,357 A    10/1997  Yoshida et al.
6,552,848 B2    4/2003  Kobayashi
8,330,734 B2   12/2012  Oohira
2012/0242606 A1*  9/2012  Mackey .................. G06F 3/044
                                                345/173
2012/0312677 A1   12/2012  Kuriki
2013/0341070 A1* 12/2013  Kim ..................... H05K 1/0213
                                                174/250

FOREIGN PATENT DOCUMENTS

JP          3007008 B2    2/2000
JP       2000-206529 A    7/2000
JP        2002-90889 A    3/2002

(Continued)

OTHER PUBLICATIONS

International Preliminary Report on Patentability (Chapter I), Dated Mar. 19, 2015 (English-Version) in International Application No. PCT/JP2013/073130.

*Primary Examiner* — Joseph Haley
(74) *Attorney, Agent, or Firm* — McGinn IP Law Group, PLLC

(57) ABSTRACT

This conductive film has a difference of over 3 cycles/mm between a peak spatial frequency for a plurality of spectral peaks in a two dimensional Fourier spectrum for transmittance image data for a wiring pattern and a peak spatial frequency for spectral peaks up to the second term in a two dimensional Fourier spectrum for transmittance image data for a microprism array pattern for a prism sheet on the display unit side of a backlight unit, for a first moire obtained by interference between a wiring pattern for a conductive section and the microprism array pattern. As a result, this conductive film is capable of suppressing the occurrence of moire and can greatly improve visibility, even when arranged upon a display unit having a backlight unit using a prism sheet.

13 Claims, 13 Drawing Sheets

(56) References Cited

FOREIGN PATENT DOCUMENTS

| | | |
|---|---|---|
| JP | 2002-351341 A | 12/2002 |
| JP | 2009-117683 A | 5/2009 |
| JP | 2010-61026 A | 3/2010 |
| JP | 2011-175628 A | 9/2011 |
| JP | 2012-108844 A | 6/2012 |

* cited by examiner

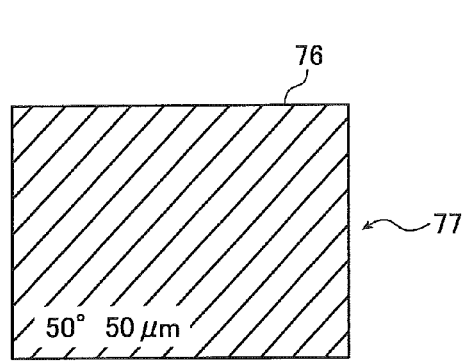
FIG. 13A
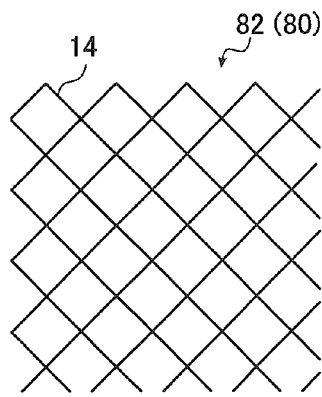
FIG. 13B
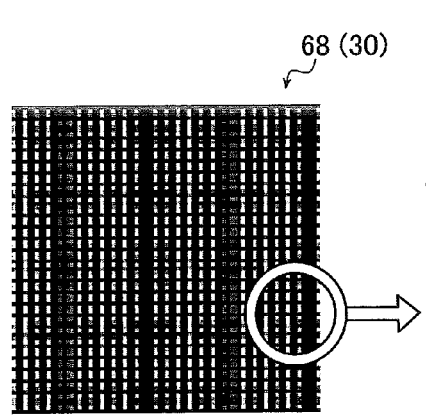
FIG. 13C
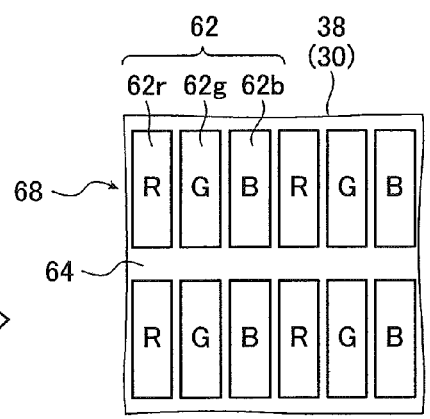
FIG. 13D
FIG. 14
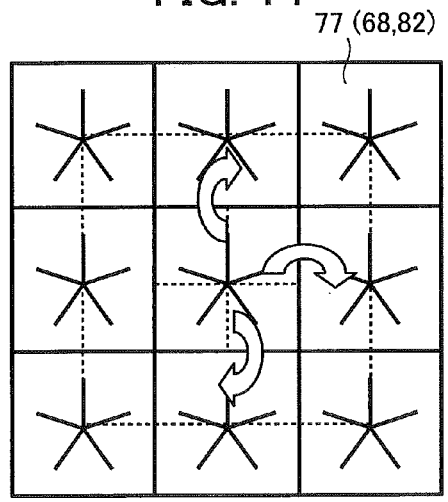

SPATIAL FREQUENCY [cycle/mm]

SPATIAL FREQUENCY [cycle/mm]

CONDUCTIVE FILM, DISPLAY DEVICE AND TOUCH PANEL COMPRISING SAME, AND CONDUCTIVE FILM PATTERN DETERMINATION METHOD

CROSS-REFERENCE TO RELATED APPLICATIONS

This application is a Continuation of PCT International Application No. PCT/JP2013/073130 filed on Aug. 29, 2013, which claims priority under 35 U.S.C. §119(a) to Japanese Application No. 2012-197815 filed on Sep. 7, 2012. The above application is hereby expressly incorporated by reference, in its entirety, into the present application.

BACKGROUND OF THE INVENTION

The present invention relates to a conductive film, a display device and a touch panel each comprising the conductive film, and a conductive film pattern determination method.

Examples of a conductive film installed on a display unit of a display device (hereinafter, also referred to as a display) include a conductive film for electromagnetic wave-shielding and a conductive film for a touch panel (for example, see JP 2009-117683 A, JP 2002-351341 A and JP 2000-206529 A).

JP 2009-117683 A filed by the applicant of the present application discloses that a second pattern, which is generated from second pattern data in which the relative distance between spectrum peaks of two-dimensional Fourier spectrums (2DFFT Sp) of the pattern data of a first pattern such as a pixel array pattern (for example, a black matrix (hereinafter, also referred to as BM) pattern) of a display and the pattern data of the second pattern such as an electromagnetic wave-shielding pattern is greater than a predetermined spatial frequency, for example, $8 \text{ cm}^{-1}$, is automatically selected.

JP 2009-117683 A also discloses that when the relative distance is not greater than the predetermined spatial frequency, changing of one or more of a rotation angle, a pitch, and a pattern width of the second pattern data to generate new second pattern data is repeated until the relative distance is greater than the predetermined spatial frequency.

In this way, in JP 2009-117683 A, it is possible to automatically select an electromagnetic wave-shielding pattern that can suppress the occurrence of moire and that can avoid an increase in surface resistivity or degradation in transparency.

JP 2009-117683 A and JP 2002-351341 A disclose a liquid crystal display device including a transparent electrode layer or a touch panel having a wiring pattern, a display portion or a display panel having a pixel array pattern, and a lighting device (backlight or front light) having a light guide plate that includes either a prism sheet having a microprism array pattern (hereinafter, also simply referred to as a "prism pattern") or a prism surface having the prism sheet, in which moire occurring due to interference and the pixel array pattern and the prism pattern can be reduced.

Particularly, JP 2002-351341 A discloses a reflection type liquid crystal display device in which the ridge of the prism surface of the light guide plate of a light guide body of the lighting device is inclined with respect to the repeating pixel arrays of the display panel, such that the occurrence of moire caused by interference between the pixel array pattern and the prism pattern of the prism surface can be inhibited.

Furthermore, JP 2000-206529 A 3 discloses a liquid crystal display device in which a pitch P2 of grooves of the light guide body or an optical sheet such as the prism sheet or a row-like pattern of the microprism of the back light and a pitch P1 of the pixel array pattern of the display panel are set so as to satisfy a predetermined relational expression, or, the relationship between P1 and P2 is specified within a predetermined range, such that the occurrence of moire fringes caused by interference between the pixel array pattern and the prism pattern of the prism surface can be reduced.

Meanwhile, JP 3007008 B discloses an image display-input apparatus for performing both the input of an image (readout of an image source) and the display of an image, which includes an image display-input panel having pixels arrayed patternwise and a backlight having a prism sheet. JP 3007008 B discloses that by making a pitch of the microprism of the prism sheet of the backlight smaller than a pitch of the pixel array pattern of the display panel, the occurrence of moire caused by interference between the pixel array pattern and the pattern of the prism surface is prevented.

SUMMARY OF THE INVENTION

Incidentally, for example, the out-cell mode, in which a touch sensor (touch panel) is mounted on pixel arrays of a display unit including a backlight using a prism sheet, has a problem in that moire occurring due to interference among the pixel arrays, the prism sheet, and the touch sensor should be taken into consideration.

JP 2009-117683 A discloses a technique of controlling a moire frequency based only on frequency information on BM (Black Matrix)/a wiring pattern of a display in producing a wiring pattern of a conductive film, and thus providing a wiring pattern having excellent visibility. However, because the technique is merely focused on moire occurring due to the interference between BM of the display and the wiring pattern of the conductive film, moire occurring by interference between a prism pattern of a prism sheet or the like, which is used in a lighting device such as a back light of a display, and BM or a wiring pattern is not taken into consideration at all. Therefore, the technique has problems in that the occurrence of moire caused by interference with a prism pattern cannot be inhibited, moire is visually recognized, and improvement of appearance of moire is unsatisfactory.

In JP 2002-351341 A, the occurrence of moire caused by interference between a prism pattern of a prism surface of a light guide plate of a lighting device and a pixel array pattern of a display panel is inhibited. However, in the document, in order to inhibit the occurrence of moire, only the pattern array direction of both the pixel array pattern and the prism pattern is inclined. Accordingly, the technique has a problem in that it has a limitation in inhibiting the moire occurring due to interference of a mesh-like pattern such as a wiring pattern.

Moreover, in JP 2002-351341 A, a transparent electrode such as ITO (Indium Tin Oxide) has a wiring pattern functioning as a touch panel. Consequentially, the only thing required for the apparatus disclosed in the document is to be capable of inhibiting the occurrence of moire caused by the interference between a prism pattern of a prism surface of a light guide plate of a light guide body of a lighting device and a pixel array pattern of a display panel. Therefore, in the document, moire occurring by interference with an opaque wiring pattern composed of thin metal wires is not regarded as a problem at all or does not need to be regarded as a problem at all. As a result, the document has a problem in that it has nothing to do with inhibiting moire occurring by interference between an opaque wiring pattern and a prism pattern and interference among three patterns including an opaque wiring pattern, a pixel array pattern, and a prism pattern, and improving appearance of moire.

In addition, as a specific method for reducing the occurrence of moire, JP 2000-206529 A merely discloses a method of specifying a relationship, which is established between a pitch P2 of a simple row-like pattern of an optical sheet of a backlight and a pitch P1 of a simple pixel array pattern of a display panel superimposed thereon in a state of inclining by a predetermined angle θ, with a predetermined relational expression or a method of specifying the relationship within a predetermined range. Therefore, similarly to the disclosure of JP 2009-117683 A, the method of the document is not applicable to a random pattern such as a mesh-like wiring pattern that can reduce moire for a pixel array pattern. Even if it is applicable to such a pattern, the document has a problem in that it has a limitation in inhibiting the occurrence of moire caused by interference with a wiring pattern.

JP 2000-206529 A describes that the method is applicable to moire occurring between a touch panel and an optical sheet or a liquid crystal panel. However, the document describes neither details thereof nor wiring of a touch panel, and it is evident that a touch panel is merely regarded as being composed of a simple repetitive linear pattern in the document. Accordingly, the method has a problem in that it cannot be used to inhibit moire occurring due to interference between a random wiring pattern and a prism pattern and interference among three patterns including a random wiring pattern, a pixel array pattern, and a prism pattern, and to improve appearance of moire.

In JP 3007008 B, a pitch of a prism sheet of a backlight is made smaller than a pitch of a pixel array pattern of a display panel so as to prevent the occurrence of moire. However, such a method is only for moire occurring between a prism sheet of a back light and a display panel, and is applicable only to a case in which both of the patterns are simple row-like patterns. Accordingly, the method has a problem in that it cannot be applied to inhibit moire occurring due to interference between a random wiring pattern and a prism pattern and interference among three patterns including a random wiring pattern, a pixel array pattern, and a prism pattern, and to improve appearance of moire.

Furthermore, as shown in FIG. 21A, a prism pattern of a prism sheet of a backlight disclosed in JP 2002-351341 A, JP 2000-206529 A and JP 3007008 B is formed of a plurality of parallel microprism arrays 75 having a minute triangular cross-sectional shape. When a prism sheet 76 is observed from the front thereof, a prism pattern 77 of the microprism arrays 75 is not visually recognized as shown in FIG. 21B. However, when the prism sheet 76 is observed from an oblique direction, the prism pattern 77 is visually recognized as shown in FIG. 21C. Consequentially, even if the occurrence of moire, which is visually recognized when the prism sheet is observed from the front thereof, can be inhibited by the techniques disclosed in JP 2002-351341 A, JP 2000-206529 A and JP 3007008 B, the occurrence of moire is not satisfactorily inhibited when the prism sheet is observed from an oblique direction. Therefore, the techniques have a problem in that they cannot prevent moire from being visually recognized.

The present invention aims to solve the aforementioned problems in the prior art, and to provide a conductive film, which can suppress the occurrence of moire and can greatly improve visibility when being installed on a display unit of a display device having a backlight unit using a prism sheet, a display device and a touch panel comprising the conductive film, and a conductive film pattern determination method.

In a case in which a transparent conductive film having wiring is used as an electrode for a touch panel, when the conductive film is superimposed on a black matrix of a display unit of a display device including a backlight unit using a prism sheet and visually recognized, moire occurring due to interference among a microprism array pattern of the prism sheet, a pixel array pattern of the display unit, and a wiring pattern of the transparent conductive film greatly impairs image quality. Therefore, the present invention particularly aims to provide a conductive film, which can suppress the occurrence of the aforementioned moire and can greatly improve visibility of display on a touch panel, a display device and a touch panel each comprising the conductive film, and a pattern determination method for the conductive film.

In order to achieve the aforementioned objects, according to a first aspect of the present invention, there is provided a conductive film installed on a display unit of a display device, comprising:
a transparent substrate; and
a conductive portion that is formed on at least one surface of the transparent substrate and formed of a plurality of thin metal wires,
wherein the display unit has a pixel array pattern and a backlight unit having at least one prism sheet in which parallel microprism arrays having a minute triangular cross-sectional shape are formed,
the conductive portion has a wiring pattern in which a plurality of openings formed by the plurality of thin metal wires is arranged in the form of mesh,
the wiring pattern is superimposed on the pixel array pattern of the display unit, and
regarding first moires occurring due to the interference between the wiring pattern of the conductive portion and a microprism array pattern of the prism sheet at the side of the display unit, a difference between peak spatial frequencies of a plurality of spectrum peaks of two-dimensional Fourier spectra of transmittance image data of the wiring pattern and peak spatial frequencies of spectrum peaks up to the second-order term of two-dimensional Fourier spectra of transmittance image data of the microprism array pattern is greater than 3 cycles/mm.

In order to achieve the aforementioned objects, according to a second aspect of the present invention, there is provided a conductive film installed on a display unit of a display device, comprising:
a transparent substrate; and
a conductive portion that is formed on at least one surface of the transparent substrate and formed of a plurality of thin metal wires,
wherein the display unit has a pixel array pattern and a backlight unit having at least one prism sheet in which parallel microprism arrays having a minute triangular cross-sectional shape are formed,
the conductive portion has a wiring pattern in which a plurality of openings formed of the plurality of thin metal wires is arranged in the form of mesh,
the wiring pattern is superimposed on the pixel array pattern of the display unit, and
regarding second moires visually recognized due to the interference among three patterns including the wiring pattern of the conductive portion, the pixel array pattern of the display unit, and a pattern of the microprism arrays of the prism sheet, a lowest frequency of the visually recognized second moires is higher than a lowest frequency of third moires occurring due to the interference between the wiring pattern and the pixel array pattern.

Regarding moire occurring due to the interference between a wiring pattern of a conductive portion and a pixel array pattern of a display unit, a difference between peak spatial frequencies of the wiring pattern and peak spatial frequencies of a plurality of spectrum peaks of two-dimensional Fourier spectra of transmittance image data of the pixel array pattern is preferably greater than 3 cycles/mm.

Furthermore, regarding moire occurring due to interference between the pixel array pattern of the display unit and a microprism array pattern of a prism sheet, a difference between peak spatial frequencies of a plurality of spectrum peaks of two-dimensional Fourier spectra of transmittance image data of the pixel array pattern and peak spatial frequencies of the microprism array pattern is preferably greater than 3 cycles/mm.

Herein, for the spectrum peaks of the wiring pattern of the conductive portion and the pixel array pattern of the display unit, it is preferable to consider spectrum peaks up to the tenth-order term.

It is preferable for the pixel array pattern to be a black matrix pattern.

It is preferable for the at least one prism sheet to be formed of two prism sheets each having the microprism array pattern orthogonal to the microprism array pattern of another prism sheet.

It is preferable that the conductive portion has a first conductive portion which is formed on one surface of the transparent substrate and formed of the plurality of thin metal wires and a second conductive portion which is formed on the other surface of the transparent substrate and formed of the plurality of thin metal wires, and the wiring pattern is formed by combining the first conductive portion with the second conductive portion.

It is preferable that a first protective layer which is disposed on the one surface and covers the first conductive portion and a second protective layer which is disposed on the other surface and covers the second conductive portion are further included, and at least one of a relative refractive index of the substrate with respect to the first protective layer and a relative refractive index of the substrate with respect to the second protective layer is equal to or greater than 0.86 and equal to or less than 1.15.

It is preferable that a first dummy electrode portion which is formed on the one surface and formed of the plurality of thin metal wires electrically insulated from the first conductive portion is further included, the first conductive portion has a plurality of wiring patterns of the first conductive portion arranged in one direction and connected to a plurality of first sensing portions, respectively, the first dummy electrode portion has a plurality of first dummy wiring patterns each arranged in a gap between adjacent wiring patterns of the first conductive portion, and a wiring density of the first dummy wiring pattern is equal to a wiring density of the wiring pattern of the first conductive portion.

Alternatively, it is preferable for the conductive portion to be formed on one surface of the transparent substrate.

In order to achieve the aforementioned objects, according to a third aspect of the present invention, there is provided a display device comprising:

a display unit that has a pixel array pattern;
a backlight unit that has at least one prism sheet in which parallel microprism arrays having a minute triangular cross-sectional shape are formed; and
the conductive film according to the aforementioned first aspect.

In order to achieve the aforementioned objects, according to a fourth aspect of the present invention, there is provided a touch panel comprising:

the conductive film according to the aforementioned first aspect; and
a detection control portion that detects a contact position or a proximity position from the one surface side of the conductive film.

In order to achieve the aforementioned objects, according to a fifth aspect of the present invention, there is provided a display device comprising:

a display unit that has a pixel array pattern and displays an image on a display screen based on a display signal;
a backlight unit that has at least one prism sheet in which parallel microprism arrays having a minute triangular cross-sectional shape are formed; and
the touch panel according to the aforementioned third aspect,
wherein the conductive film of the touch panel is disposed on the display screen, in a state in which the other surface side thereof faces the display unit.

In order to achieve the aforementioned objects, according to a sixth aspect of the present invention, there is provided a wiring pattern determination method for a conductive film that is installed on a display unit of a display device including the display unit having a pixel array pattern and a backlight unit having at least one prism sheet, in which parallel microprism arrays having a minute triangular cross-sectional shape are formed, and that has a wiring pattern in which a plurality of openings formed by a plurality of thin metal wires are arranged in a form of mesh, the method comprising steps of:

obtaining transmittance image data of the wiring pattern and transmittance image data of a pattern of the microprism arrays;

calculating peak spatial frequencies of a plurality of spectrum peaks of two-dimensional Fourier spectra of the transmittance image data of the wiring pattern and peak spatial frequencies of spectrum peaks up to a second-order term of two-dimensional Fourier spectra of the transmittance image data of the pattern of the microprism arrays, by performing two-dimensional Fourier transform on the transmittance image data of the wiring pattern and the transmittance image data of the pattern of the microprism arrays;

calculating a difference between the calculated plurality of peak frequencies of the wiring pattern and the calculated peak frequencies up to the second-order term of the pattern of the microprism arrays for each combination of the peak frequencies; and comparing the obtained difference in the peak frequency between the wiring pattern and the pattern of the microprism arrays with 3 cycles/mm, wherein when the difference of the peak frequency calculated for all combinations is greater than 3 cycles/mm, the wiring pattern is set to be a wiring pattern of the conductive film; and when the difference of the peak frequency is equal to or less than 3 cycles/mm, the transmittance image data of the wiring pattern is updated to transmittance image data of a new wiring pattern, the step of calculating the peak frequencies, the step of calculating the difference of the peak frequency, and the step of comparing the difference of the peak frequency with 3 cycles/mm are repeated until the difference of the peak frequency of all combinations becomes greater than 3 cycles/mm, whereby the wiring pattern is optimized with respect to second moires occurring due to interference among three patterns including the wiring pattern, the pixel array pattern of the display unit, and the pattern of the microprism arrays of the prism sheet.

In order to achieve the aforementioned objects, according to a seventh aspect of the present invention, there is provided wiring pattern determination method for a conductive film that is installed on a display unit of a display device including the display unit having a pixel array pattern and a backlight unit having at least one prism sheet, in which parallel microprism arrays having a minute triangular cross-sectional shape are formed, and that has a wiring pattern in which a plurality of openings formed by a plurality of thin metal wires are arranged in a form of mesh, the method comprising steps of:

obtaining transmittance image data of the wiring pattern, transmittance image data of the pixel array pattern of the display unit on which the wiring pattern is superimposed, and transmittance image data of a pattern of the microprism arrays of the display unit;

calculating peak spatial frequencies of a plurality of spectrum peaks of two-dimensional Fourier spectra of the transmittance image data of the wiring pattern, peak spatial frequencies of a plurality of spectrum peaks of two-dimensional Fourier spectra of the transmittance image data of the pixel array pattern, and peak spatial frequencies of spectrum peaks up to a second-order term of two-dimensional Fourier spectra of the transmittance image data of the pattern of the microprism arrays, by performing two-dimensional Fourier transform on the transmittance image data of the wiring pattern, the transmittance image data of the pixel array pattern, and the transmittance image data of the pattern of the microprism arrays;

calculating frequencies of third moires from the calculated plurality of peak spatial frequencies of the pixel array patterns and the calculated plurality of peak frequencies of the wiring pattern;

determining peak frequencies of the third moires from the calculated frequencies of the third moires occurring due to interference between the wiring pattern and the pixel array pattern;

calculating frequencies of second moires occurring due to interference among three patterns including the wiring pattern, the pixel array pattern, and the pattern of the microprism arrays, by calculating a difference between the determined peak frequencies of the third moires and the calculated peak frequencies up to the second-order term of the pattern of the microprism arrays for each combination of the peak frequencies;

determining a lowest frequency of visually recognized second moires from the calculated plurality of frequencies of the second moires and determining a lowest frequency of visually recognized third moires from the plurality of frequencies of the third moires calculated in the aforementioned step; and comparing the determined lowest frequency of the second moires with the lowest frequency of the third moires, wherein when the lowest frequency of the second moires is higher than the lowest frequency of the third moires, the wiring pattern is set to be a wiring pattern of the conductive film; and when the lowest frequency of the second moires is equal to or lower than the lowest frequency of the third moires, the respective steps described above are repeated until the lowest frequency of the second moires becomes higher than the lowest frequency of the third moires; whereby the wiring pattern is optimized with respect to the second moires occurring due to interference among three patterns including the wiring pattern, the pixel array pattern of the display unit, and the pattern of the microprism arrays of the prism sheet.

Herein, preferable embodiments in the first and second embodiments of the present invention can also be regarded as preferable embodiments in the sixth and seventh embodiments of the present invention respectively.

As described above, according to the present invention, even when a conductive film is installed and used on a display unit of a display device having a backlight unit that uses a prism sheet, the occurrence of moire can be suppressed, and visibility can be greatly improved.

That is, in the present invention, a difference of the peak spatial frequencies of spectrum peaks up to the second-order term of two-dimensional Fourier spectra of the microprism array pattern of the prism sheet and the wiring pattern of the conductive film, which is obtained by frequency analysis, is limited to a numerical value greater than a predetermined value such that the appearance of moire becomes excellent. Consequentially, it is possible to prevent impairment of image quality caused by the occurrence of moire, and to obtain excellent visibility. Furthermore, in the present invention, the lowest frequency of second moires, which are visually recognized due to the interference between two frequency peaks of moires occurring due to the interference among the microprism array pattern of the prism sheet, the wiring pattern of the conductive film, and the pixel array pattern of the display device, is limited such that it becomes higher than the lowest frequency of third moires occurring due to the interference between the wiring pattern and the pixel array pattern. Therefore, it is possible to prevent impairment of image quality caused by the occurrence of moire, and to obtain excellent visibility.

Particularly, in a case in which a conductive film is used as an electrode for a touch panel, according to the present invention, it is possible to suppress moire, which greatly impairs image quality when the conductive film is superimposed on a black matrix of a display unit of a display device including a backlight unit using a prism sheet and visually recognized, and to greatly improve visibility of display on the touch panel.

BRIEF DESCRIPTION OF THE DRAWINGS

FIG. 13A is a schematic explanatory view illustrating an example of a microprism array pattern of a prism sheet of a backlight unit of a display unit to which the conductive film according to the present invention is applied; FIG. 13B is a schematic explanatory view illustrating an example of a wiring pattern of the conductive film according to the present invention; FIG. 13C is a schematic explanatory view illustrating an example of a pixel array pattern of the display unit on which the wiring pattern of the conductive film of FIG. 13B is superimposed; and FIG. 13D is a partial enlarged view of the pixel array pattern of FIG. 13C.

FIG. 14 is a schematic explanatory view illustrating an example of flipping processing that is performed in preparing transmission image data in the wiring pattern determination method shown in FIG. 11.

DETAILED DESCRIPTION OF THE INVENTION

Hereinafter, a conductive film, a display device and a touch panel each comprising the conductive film, and a pattern determination method for the conductive film according to the present invention will be specifically described with reference to preferable embodiments shown in the attached drawings.

In the following description, a conductive film for a touch panel will be described as a typical example of the conductive film of the present invention, but the present invention is not limited thereto. The conductive film may be any type as long as it is a conductive film installed on a display unit of a display device including a backlight using a prism sheet, such as a Liquid Crystal Display (LCD), a Plasma Display Panel (PDP), an Organic Electroluminescence Display (OELD), or an inorganic EL display. Needless to say, the conductive film may be a conductive film for an electromagnetic wave-shielding or the like.

Figure 1:
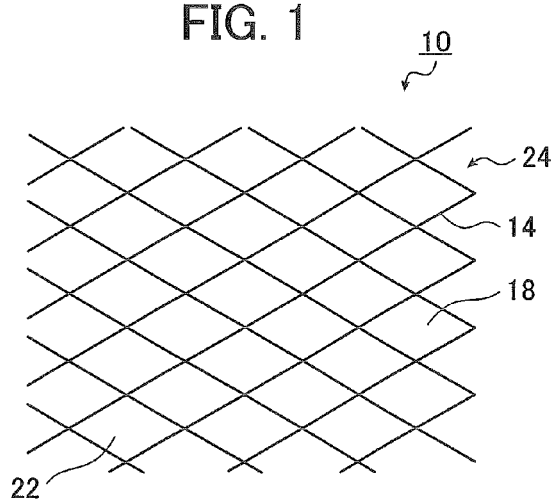
FIG. 1 is a partial enlarged plan view schematically showing an example of a conductive film according to a first embodiment of the present invention.
Figure 2:
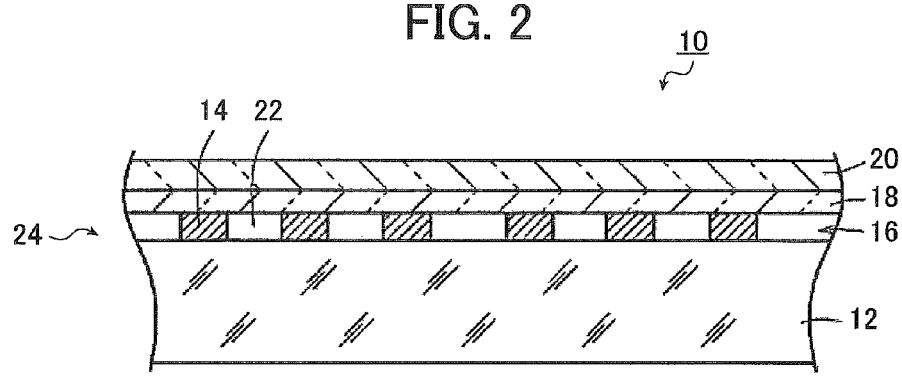
FIG. 2 is a schematic partial cross-sectional view of the conductive film shown in FIG. 1.

FIG. 1 is a partial enlarged plan view schematically showing an example of a conductive film according to a first embodiment of the present invention, and FIG. 2 is a schematic partial cross-sectional view of the conductive film. Herein, FIG. 1 is an enlarged view showing a part of a wiring pattern of a mesh shape of the conductive film of the present embodiment.

As shown in these views, a conductive film 10 of the present embodiment is to be installed on a display unit of a display device including a backlight using a prism sheet. It is a conductive film having a wiring pattern excellent in suppressing the occurrence of moire with respect to a microprism array pattern (hereinafter, referred to as a "prism pattern") of a prism sheet and a black matrix (BM) of a display unit. Particularly, it is a conductive film having a wiring pattern optimized in terms of moire appearance with respect to the prism pattern and a black matrix pattern (hereinafter, referred to as a "BM pattern") when being superimposed on the BM pattern. As shown in FIG. 2, the conductive film 10 has a transparent substrate 12, a conductive portion 16 that is formed on one surface (the surface of the upper side in FIG. 2) of the transparent substrate 12 and is formed of a plurality of thin wires 14 made of a metal (hereinafter, referred to as "thin metal wires"), and a protective layer 20 that is adhered approximately to the entire surface of the conductive portion 16 via an adhesive layer 18 so as to cover the thin metal wires 14.

The transparent substrate 12 is formed of a material having an insulating property and having a high translucency, and examples thereof include a resin, a glass, and silicon. Examples of the resin include PET (Polyethylene Terephthalate), PMMA (Polymethyl methacrylate), PP (polypropylene) and PS (polystyrene).

As shown in FIG. 1, the conductive portion 16 has a wiring pattern 24 of a mesh shape with openings 22 between neighboring thin metal wires 14. The thin metal wire 14 is not particularly limited as long as it is a thin wire made of metal having high conductivity, and examples of the thin metal wire include a thin wire made of gold (Au), silver (Ag) and copper (Cu). The line width of the thin metal wire 14 is preferably small in terms of appearance, and can be, for example, less than or equal to 30 μm. For application to a touch panel, the line width of the thin metal wires 14 preferably ranges from 0.1 µm to 15 µm, more preferably ranges from 1 µm to 9 µm, and still more preferably ranges from 2 µm to 7 µm.

Specifically, the conductive portion 16 has the wiring pattern 24 in which the plurality of thin metal wires 14 are arranged in the form of a mesh. In the illustrated example, the mesh shape of an opening 22 is rhombic, but the present invention is not limited thereto. Any polygonal shape having at least three sides may be employed as long as it can constitute the wiring pattern 24 optimized in terms of moire appearance with respect to a predetermined prism pattern and a predetermined BM pattern which will be described later. The mesh shapes may be the same as or different from each other, and examples thereof include polygons that are the same as or different from each other, such as triangles, for example, a regular triangle and an equilateral triangle, quadrangles (rectangles), for example, a square and rectangles, pentagons, and hexagons. That is, as long as it is a wiring pattern optimized in terms of moire appearance with respect to the prism pattern and the BM pattern, a wiring pattern formed by the arrangement of openings 22 having regularity or a wiring pattern randomized by the arrangement of openings 22 having different shapes may be employed.

As materials of the adhesive layer 18, a wet laminate adhesive, a dry laminate adhesive, a hot melt adhesive, or the like can be mentioned.

Similarly to the transparent substrate 12, the protective layer 20 is formed of a material having a high translucency, such as a resin, a glass, and silicon. The refractive index n1 of the protective layer 20 is preferably a value that is equal to or close to the refractive index n0 of the transparent substrate 12. In this case, the relative refractive index nr1 of the transparent substrate 12 with respect to the protective layer 20 becomes a value close to 1.

Here, the refractive index in this specification means a refractive index for light with a wavelength of 589.3 nm (D line of sodium). For example, in regard to resins, the refractive index is defined by ISO 14782: 1999 (corresponding to JIS K 7105) that is an international standard. In addition, the relative refractive index nr1 of the transparent substrate 12 with respect to the protective layer 20 is defined as nr1=(n1/n0). Here, it is preferable that the relative refractive index nr1 be in a range of 0.86 or more and 1.15 or less, and a range of 0.91 or more and 1.08 or less is more preferable.

By limiting the relative refractive index nr1 to this range and controlling light transmittance between members of the transparent substrate 12 and the protective layer 20, it is possible to further improve appearance of moire.

The conductive film 10 according to the first embodiment described above has the conductive portion 16 on only one surface of the transparent substrate 12, but the present invention is not limited to this configuration, and the conductive film 10 may have the conductive portions on both surfaces of the transparent substrate 12.

Figure 3:
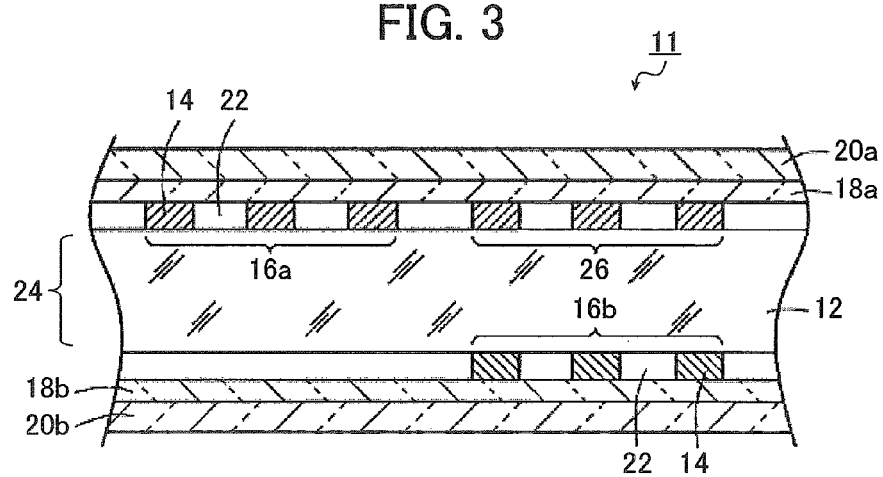
FIG. 3 is a schematic partial cross-sectional view of an example of a conductive film according to a second embodiment of the present invention.
Figure 4:
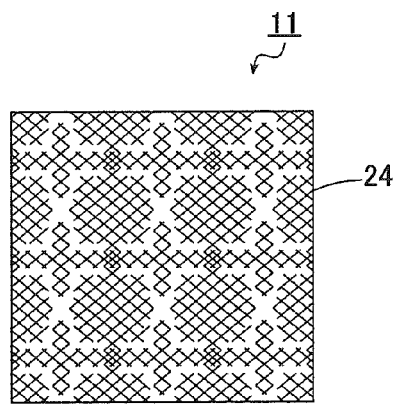
FIG. 4 is a schematic plan view of the conductive film shown in FIG. 3.

FIG. 3 is a schematic partial cross-sectional view showing an example of a conductive film according to a second embodiment of the present invention. FIG. 4 is a schematic plan view of the conductive film shown in FIG. 3. The partial enlarged plan view of the conductive film according to the second embodiment shown in FIG. 4 is the same as the partial enlarged plan view of the conductive film according to the first embodiment shown in FIG. 1, and accordingly, will not be shown herein.

As shown in FIG. 3 and FIG. 4, the conductive film 11 according to the second embodiment includes a first conductive portion 16a and a dummy electrode portion 26 formed on one surface (on the upper side of FIG. 3) of the transparent substrate 12, a second conductive portion 16b formed on the other surface (on the lower side of FIG. 3) of the transparent substrate 12, a first protective layer 20a bonded to the substantially entire surface of the first conductive portion 16a and the first dummy electrode portion 26 through a first adhesive layer 18a, and a second protective layer 20b boned to the substantially entire surface of the second conductive portion 16b through a second adhesive layer 18b.

In the conductive film 11, the first conductive portion 16a and the dummy electrode portion 26 each include plural thin metal wires 14 and are formed on one surface (on the upper side of FIG. 3) of the transparent substrate 12, and the second conductive portion 16b includes plural thin metal wires 14 and is formed on the other surface (on the lower side of FIG. 3) of the transparent substrate 12. Here, the dummy electrode portion 26 is formed on one surface (on the upper side of FIG. 3) of the transparent substrate 12 similarly to the first conductive portion 16a, and includes plural thin metal wires 14 which are similarly arranged at positions corresponding to the plural thin metal wires 14 of the second conductive portion 16b formed on the other surface (on the lower side of FIG. 3), as illustrated in the drawing.

The dummy electrode portion 26 is disposed to be apart from the first conductive portion 16a by a predetermined distance and is in the state of being electrically insulated from the first conductive portion 16a.

In the conductive film 11 according to this embodiment, since the dummy electrode portion 26 composed of plural thin metal wires 14 corresponding to the plural thin metal wires 14 of the second conductive portion 16b formed on the other surface (on the lower side of FIG. 3) of the transparent substrate 12 is formed on one surface (on the upper side of FIG. 3) of the transparent substrate 12, scattering due to the thin metal wires on the one surface (on the upper side of FIG. 3) of the transparent substrate 12 can be controlled, and it is thus possible to improve appearance of electrode.

Here, the first conductive portion 16a and the dummy electrode portion 26 have a wiring pattern 24 of a mesh shape formed by the thin metal wires 14 and the openings 22. The second conductive portion 16b has a wiring pattern 24 of a mesh shape formed by the thin metal wires 14 and the openings 22, similarly to the first conductive portion 16a (refer to FIG. 4). As described above, the transparent substrate 12 is formed of an insulating material and the second conductive portion 16b is in the state of being electrically insulated from the first conductive portion 16a and the dummy electrode portion 26.

In addition, the first and second conductive portions 16a and 16b and the dummy electrode portion 26 can be similarly formed of the same material as that of the conductive portion 16 of the conductive film 10 illustrated in FIG. 2.

The first protective layer 20a is bonded to the substantially entire surface of the first conductive portion 16a and the dummy electrode portion 26 with the first adhesive layer 18a so as to cover the thin metal wires 14 of the first conductive portion 16a and the dummy electrode portion 26.

The second protective layer 20b is bonded to the substantially entire surface of the second conductive portion 16b with the second adhesive layer 18b so as to cover the thin metal wires 14 of the second conductive portion 16b.

Here, the first adhesive layer 18a and the second adhesive layer 18b can be similarly formed of the same material as that of the adhesive layer 18 of the conductive film 10 illustrated in FIG. 2, and the material of the first adhesive layer 18a may be same as or different from the material of the second adhesive layer 18b.

The first protective layer 20a and the second protective layer 20b can be similarly formed of the same material as that of the protective layer 20 of the conductive film 10 illustrated in FIG. 2, and the material of the first protective layer 20a may be same as or different from the material of the second protective layer 20b.

Both the refractive index n2 of the first protective layer 20a and the refractive index n3 of the second protective layer 20b may be a value equal or close to the refractive index n0 of the transparent substrate 12, similarly to the protective layer 20 of the conductive film 10 according to the first embodiment. In this case, both the relative refractive index nr2 of the transparent substrate 12 with respect to the first protective layer 20a and the relative refractive index nr3 of the transparent substrate 12 with respect to the second protective layer 20b are a value close to 1. Here, the definitions of the refractive index and the relative refractive index are the same as the definitions as in the first embodiment. Accordingly, the relative refractive index nr2 of the transparent substrate 12 with respect to the first protective layer 20a is defined as nr2=(n2/n0), and the relative refractive index nr3 of the transparent substrate 12 with respect to the second protective layer 20b is defined as nr3=(n3/n0).

Here, similarly to the relative refractive index nr1, it is preferable that the relative refractive index nr2 and the relative refractive index nr3 be in a range of 0.86 or more and 1.15 or less, and a range of 0.91 or more and 1.08 or less is more preferable.

By limiting the relative refractive index nr2 and the relative refractive index nr3 to this range, it is possible to further improve appearance of moire, similarly to the limitation of the range of the relative refractive index nr1.

The conductive film 10 of the first embodiment and the conductive film 11 of the second embodiment of the present invention described above are applied to, for example, a touch panel of a display unit 30 (display portion) schematically shown in FIG. 5, which will be described later. The conductive films have a wiring pattern optimized in terms of moire appearance with respect to the pixel array pattern of the display unit 30, that is, the black matrix (hereinafter, also referred to as "BM") pattern and the prism pattern of a prism sheet 76 of a backlight unit 42 of the display unit 30. In the present invention, the wiring pattern optimized in terms of moire appearance with respect to the BM (pixel array) pattern and the prism pattern refers to one, two, or more groups of wiring patterns in which moire with respect to a predetermined BM pattern and a predetermined prism pattern is not visually recognized by a human being. Furthermore, in the present invention, in two or more groups of optimized wiring patterns, it is possible to rank the wiring patterns from a wiring pattern which is most difficult to visually recognize to a wiring pattern which is less difficult to visually recognize, and one wiring pattern in which moire is most difficult to visually recognize can be determined.

The optimization of moire appearance of a wiring pattern with respect to a predetermined BM pattern and a predetermined prism pattern will be described later.

The conductive film of the present invention is basically constituted as above.

Next, a display device in which the conductive film of the present invention is installed will be described with reference to FIGS. 5 and 6.

Figure 5:
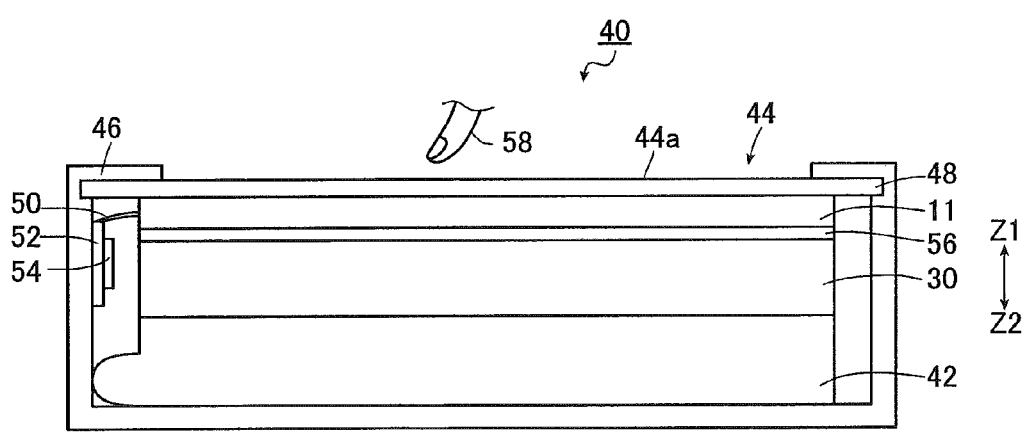
FIG. 5 is a schematic cross-sectional view of an example of a display device in which the conductive film shown in FIG. 3 has been installed.

FIG. 5 is a schematic cross-sectional view of an example of a display device in which the conductive film shown in FIG. 3 is installed. FIG. 6 is a cross-sectional view schematically showing a specific constitution of the display device shown in FIG. 5.

Figure 6:
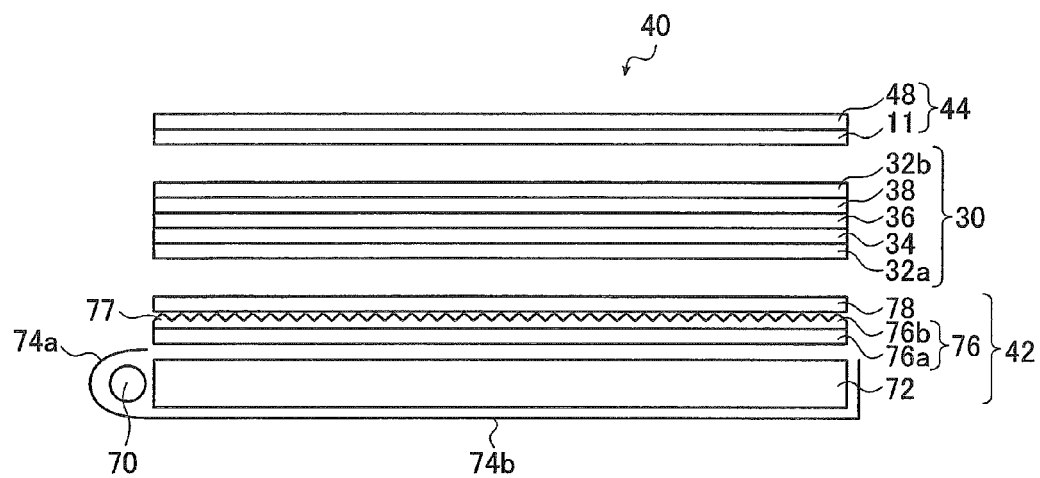
FIG. 6 is a schematic cross-sectional view schematically showing an example of a specific constitution of the display device shown in FIG. 5.

In FIGS. 5 and 6, as a typical example of a display device 40, a projected capacitive type touch panel in which the conductive film 11 according to the second embodiment of the present invention is installed is described. However, needless to say, the present invention is not limited thereto.

As shown in FIG. 5, the display device 40 has a display unit 30 (see FIG. 3) that can display a color image and/or a monochromic image, a backlight unit 42 of the display unit 30, a touch panel 44 that detects a contact position from an input surface 44a (at the side in the direction of arrow Z1), and a housing 46 that accommodates the display unit 30, the backlight unit 42, and the touch panel 44. Through a large opening provided on one surface (at the side in the direction of arrow Z1) of the housing 46, a user can have access to the touch panel 44.

The touch panel 44 includes not only the conductive film 11 (refer to FIGS. 1 and 3) described above but also a cover member 48 laminated on the surface (at the side in the direction of arrow Z1) of the conductive film 11, a flexible substrate 52 electrically connected to the conductive film 11 through a cable 50, and a detection control portion 54 disposed on the flexible substrate 52.

The conductive film 11 is bonded to the surface (arrow Z1 direction side) of the display unit 30 through an adhesive layer 56. The conductive film 11 is disposed on the display screen such that the other main surface side (second conductive portion 16b side) faces the display unit 30.

The cover member 48 functions as the input screen 44a by covering the surface of the conductive film 11. In addition, by preventing direct contact of a contact body 58 (for example, a finger or a stylus pen), it is possible to suppress the occurrence of a scratch, adhesion of dust, and the like, and thus it is possible to stabilize the conductivity of the conductive film 11.

For example, the material of the cover member 48 may be a glass or a resin film. One surface (arrow Z2 direction side) of the cover member 48 may be coated with silicon oxide or the like and be bonded to one surface (arrow Z1 direction side) of the conductive film 11. In order to prevent damage due to rubbing or the like, the conductive film 11 and the cover member 48 may be pasted together.

The flexible substrate 52 is an electronic substrate having flexibility. In the example shown in this diagram, the flexible substrate 52 is fixed to the inner wall of the side surface of the housing 46, but the position fixedly set up may be changed in various ways. The detection control portion 54 constitutes an electronic circuit that catches a change in the capacitance between the contact body 58 and the conductive film 11 and detects the contact position (or the proximity position) when the contact body 58 that is a conductor is brought into contact with (or comes close to) the input screen 44a.

As shown in FIG. 6, the display unit 30 is a liquid crystal display panel constituted with a polarizing filter (polarizing plate) 32a, an array substrate 34 including wiring, a TFT circuit, an electrode to be sub pixels, and the like, a liquid crystal layer 36 containing a liquid crystal material, a color filter substrate 38 including a color filter, a black matrix (BM 64: see FIG. 7), a common electrode, and the like, and a polarizing filter (polarizing plate) 32b that are layered in this order from the lower side in the drawing.

A pair of polarizing filters 32a and 32b, the array substrate 34, the liquid crystal layer 36, and the color filter 38 as constituents of the display unit 30 are not particularly limited, and those known in the prior art can be used as these.

Herein, as described above, the display unit 30 is not limited to the liquid crystal display panel shown in FIG. 6.

Figure 7:
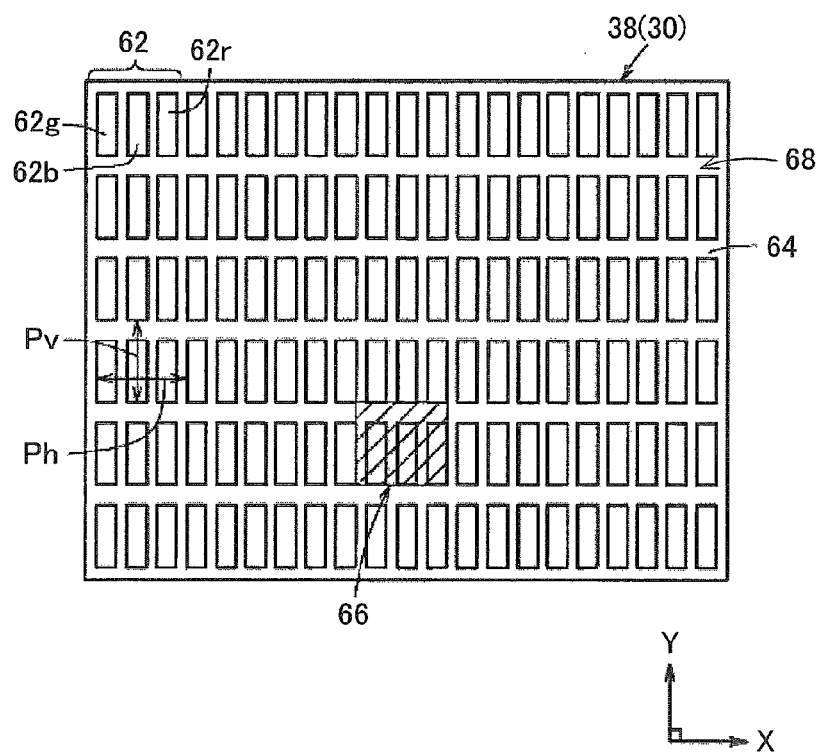
FIG. 7 is a schematic explanatory view illustrating an example of a pixel array pattern of a color filter substrate of a display unit to which the conductive film according to the present invention is applied.

FIG. 7 is a schematic explanatory view illustrating an example of a pixel array pattern of a color filter substrate of a display unit to which the conductive film of the present invention is applied.

As shown in FIG. 7, in the color filter substrate 38 of the display unit 30, a plurality of pixels 62 are arranged in the form of a matrix, whereby a predetermined pixel array pattern is constituted. Each of the pixels 62 is constituted with three sub-pixels (a red sub-pixel 62*r*, a green sub-pixel 62*g*, and a blue sub-pixel 62*b*) arranged in the horizontal direction. One sub-pixel has a rectangular shape which is long in the vertical direction. An array pitch in the horizontal direction (horizontal pixel pitch Ph) of the pixels 62 and an array pitch in the vertical direction (vertical pixel pitch Pv) of the pixels 62 are approximately the same as each other. That is, one pixel 62 and a black matrix (BM) 64 (pattern material) surrounding the one pixel 62 form a square shape (see a shaded area 66). The aspect ratio of one pixel 62 is not equal to 1, but set such that the length in the horizontal direction (lateral)>the length in the vertical direction (longitudinal).

Figure 21A:
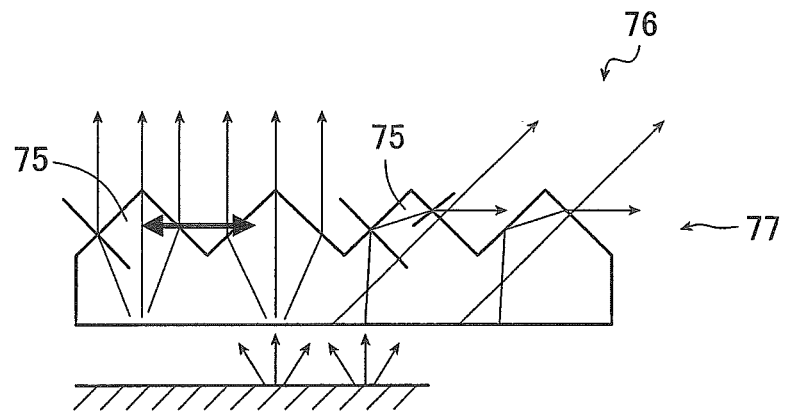
FIG. 21A is a cross-sectional view of an example of a prism sheet of a backlight.
Figure 21B:
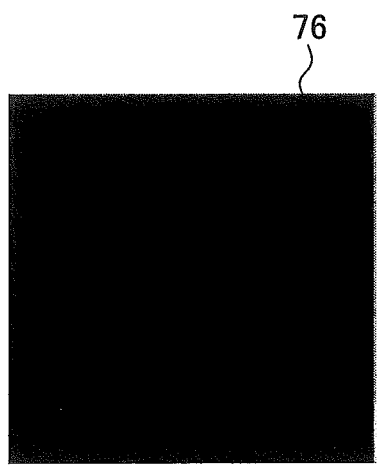
FIGS. 21B and 21C are views showing periodicity of the prism sheet obtained when the prism sheet shown in FIG. 21A is observed from the front thereof and observed from an oblique direction, respectively.
Figure 21C:
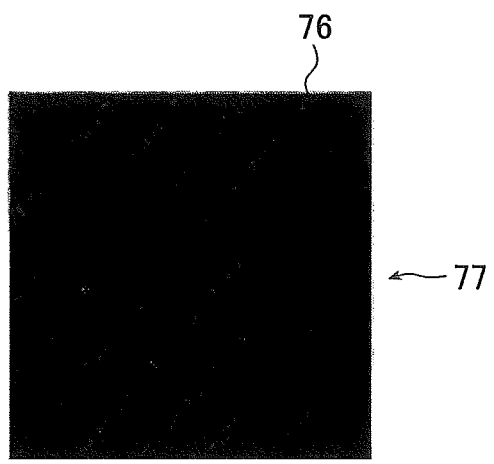

As is evident from FIG. 7, the pixel array pattern constituted with the sub-pixels 62*r*, 62*g*, and 62*b* of each of the plurality of pixels 62 is defined by a BM pattern 68 of a BM 64 surrounding each of these sub-pixels 62*r*, 62*g*, and 62*b*, and the moire occurring when the display unit 30 and the conductive film 10 or 11 are superimposed on each other is generated due to the interference among the BM pattern 68 of the BM 64 of the color filter substrate 38 of the display unit 30, the wiring pattern 24 of the conductive film 10 or 11, and the prism pattern 77 (see FIG. 21(A)) of the prism sheet 76 of the backlight unit 42. Consequentially, in a strict sense, the BM pattern 68 is an inverted pattern of the pixel array pattern, but herein, both the patterns are treated as the same pattern.

For example, when the conductive film 10 or 11 is disposed on the display portion of the display unit 30 having the BM pattern 68 constituted with the BM 64, since in wiring pattern 24 of the conductive film 11 is optimized in terms of moire appearance with respect to the BM (pixel array) pattern 68, there is substantially no interference in spatial frequency among the array period of the pixels 62, the wiring arrangement of the thin metal wires 14 of the conductive film 10 or 11, and the arrangement of the microprism arrays 75 (see FIG. 21(A)) of the prism sheet 76 of the backlight unit 42, and the occurrence of moire is inhibited.

Herein, the display unit 30 shown in FIG. 7 may be constituted with a display panel such as a plasma panel, an organic EL panel, or an inorganic EL panel other than the liquid crystal panel shown in the drawing.

The backlight unit 42 emits planar light, which has a uniform brightness distribution overall and preferably has a bell-shaped brightness distribution in which the brightness distribution is uniform in the central portion and the brightness is reduced in the portion around extremities, and supplies the light as backlight of the display unit 30. As shown in FIG. 6, the backlight unit 42 is disposed at the rear surface side of the display unit 30, that is, at the lower side in the drawing, and has a light source 70, a light guide plate 72, a light-source reflection sheet (a reflector plate) 74*a* disposed at the rear side of the light source 70, a reflection sheet (reflector plate) 74*b* disposed at the rear surface side and the end surface side of the light guide plate 72, two prism sheets 76 (76*a* and 76*b*) disposed at the front surface side (side of the display unit 30) of the light guide plate 72, and a diffusion sheet 78 disposed on the prism sheet 76.

Herein, the light source 70 radiates light that is caused to enter an incidence surface of the light guide plate 72. As the light source 70, it is possible to use light sources known in the prior art that is disposed in a state of facing and being parallel to the light incidence surface, such as a fluorescent tube, an LD (laser diode) array, or an LED (light emitting diode) array. The light source 70 is not necessarily disposed on one of four light incidence surfaces of the light guide plate 72 as illustrated in the drawing. It may be disposed on two light incidence surfaces facing each other or on four light incidence surfaces facing one another.

The light guide plate 72 is formed of a transparent flat plate which has a rectangular light emission surface on the display unit 30 side and has a light incidence surface on at least one of four lateral surfaces including four sides of the light emission surface. The light guide plate 72 is for propagating the light, which has been emitted from the light source 70 and entered through the light incidence surface, in the internal direction parallel to the light emission surface.

In the illustrated example, the light guide plate 72 is in the form of a cuboidal flat plate, but the present invention is not limited thereto. The rear surface of the light guide plate facing the light emission surface may be inclined such that the thickness of the light guide plate increases or decreases toward the other side from the light incidence surface, may be inclined toward the central portion thereof such that the central portion becomes concave or convex, or may be inclined stepwise just like a tandem type.

Moreover, for the purpose of accelerating the propagation of the incident light in the internal direction parallel to the light emission surface, or for the purpose of accelerating the progress of the incident light to the light emission surface on the display unit 30 side, scattering particles that scatter the incident light so as to cause internal reflection of the incident light may be dispersed in the light guide plate 72.

Herein, it is preferable to adjust the shape of the light guide plate 72 or adjust the dispersion state of the scattering particles, such that the brightness distribution of the emission light in the light emission surface becomes uniform on at least the entire surface of the central portion.

The light-source reflection sheet 74*a* is disposed such that it covers the light source 70 from the rear side of the light source 70 excluding the light incidence surface of the light guide plate 72. The reflection sheet 74*a* is for reflecting the light, which has been emitted from the light source 70 but has not entered the light incidence surface of the light guide plate 72, to the light incidence surface side.

The reflection sheet 74*b* is disposed such that it covers the entire rear surface of the light guide plate 72 and covers the entire end surface facing the light incidence surface as shown in the illustrated example. The reflection sheet 74*b* is for reflecting the light, which has been emitted from the light source 70, entered from the light incidence surface of the light guide plate 72, and emitted from the rear surface and the end surface, and then causing the light to once again enter the inside of the light guide plate 72 from the rear surface and the end surface.

The prism sheet 76 is for making the brightness distribution of the light, which is emitted from the light emission surface (particularly, the central area) of the light guide plate 72, more uniform on the light emission surface. As shown in FIG. 21(A), the prism sheet 76 is a transparent sheet in which a plurality of parallel microprism arrays 75 having a minute triangular cross-sectional shape is formed. As shown in the example illustrated in FIG. 8, it is preferable for the prism sheet 76 to include two prism sheets 76*a* and 76*b* in which the arrangement directions of the row-like microprism arrays 75, that is, the microprism array patterns (prism patterns) 77, are approximately orthogonal to each other.

Figure 8A:
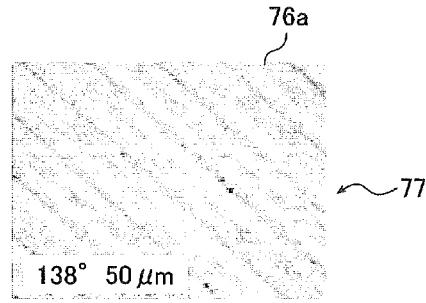
FIGS. 8A and 8B are views each showing an example of a prism array pattern of a set of prism sheets of a backlight used in the display device shown in FIG. 5.
Figure 8B:
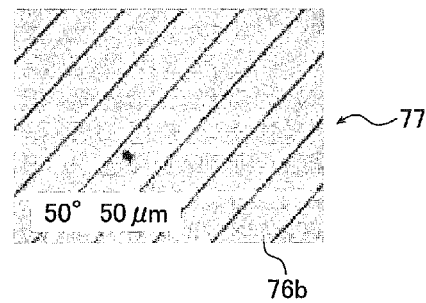

FIGS. 8(A) and 8(B) show the prism patterns of the two prism sheets 76*a* and 76*b*, respectively. Herein, the prism pattern 77 of the prism sheet 76*a* shown in FIG. 8(A) has a pitch of 50 μm and an angle of inclination of 138°, and the prism pattern 77 of the prism sheet 76*b* shown in FIG. 8(B) has a pitch of 50 μm and an angle of inclination of 50° C. As is evident from the drawings, two patterns 77 are approximately orthogonal to each other.

The pitch of the prism pattern 77 of the prism sheet 76 used in the present invention is not particularly limited. However, because it is necessary to inhibit the occurrence of moire caused by the interference among the BM 64 of the display unit 30, the conductive portion 16, or 16*a* and 16*b* of the conductive film 10 or 11, and the prism sheet 76 of the backlight unit 42, the pitch is preferably 20 μm to 50 μm.

The diffusion sheet 78 is for making the brightness distribution of the light, which is emitted from the light emission surface (particularly, the central area) of the light guide plate 72, more uniform on the light emission surface. In addition, the diffusion sheet 78 is for making the brightness distribution of the light, which has been transmitted through the prism sheet 76, preferably, the two prism sheets 76*a* and 76*b*, uniform and for further reducing the likelihood that illuminance unevenness may be visually recognized. When unevenness of the emission light of the light guide plate 72 is reduced by the aforementioned prism sheet 76 (76*a* and 76*b*) to such a degree that it cannot be visually recognized, the backlight unit 42 may not include the diffusion sheet 78.

Herein, the prism sheet 76 (76*a* and 76*b*) or the diffusion sheet 78 is an optical sheet (optical member) for eliminating unevenness of the light emitted from the backlight unit 42. Therefore, if necessary, the number of the sheets may be increased or decreased, and needless to say, other optical films effective for inhibiting unevenness of light may also be used.

The backlight unit used in the present invention is not limited to the backlight unit 42 shown in FIG. 6, and it is possible to use backlights known in the prior art including the backlights disclosed in JP 2002-351341 A, JP 2000-206529 A and JP 3007008 B, as long as they use a prism sheet or use a light guide plate or a light guide sheet having a prism surface instead of a prism sheet. Furthermore, needless to say, the backlight unit is not limited to the backlight of an edge light type (side light type or light guide plate type) illustrated in the drawing, and may be a direct type.

In the display device 40 constituted as above, the interference among a predetermined prism pattern 77 of the prism sheet 76 of the backlight unit 42, a predetermined BM pattern 68 of the display unit 30, and the wiring pattern 24 of the conductive film 10 or 11 should be considered. The interference can be considered as below, and the results are shown in FIG. 9.

Figure 9:
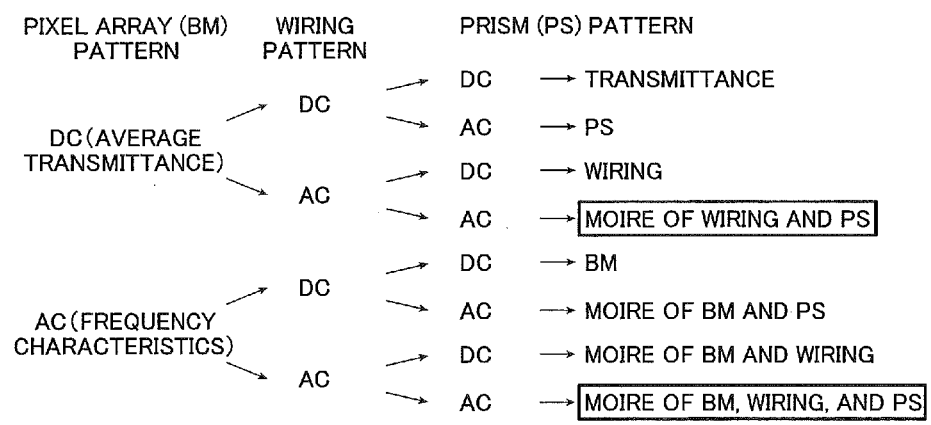
FIG. 9 is an explanatory view illustrating the interference that should be considered in a combination of a pixel array pattern of a display unit of a display device, a wiring pattern of a conductive film and a prism array pattern of a prism sheet.

As shown in FIG. 9, each of the BM (pixel array) pattern, the wiring pattern, and the prism pattern (prism sheet) optically has a 0 frequency component showing an average transmittance and a frequency component showing frequency characteristics, and herein, the components are referred to as a DC component and an AC component, respectively. As the interference among the BM (pixel array) pattern, the wiring pattern, and the prism pattern (prism sheet) that should be considered in relation to the occurrence of moire, there are three cases of interference resulting from two AC components and one case of interference resulting from three AC components.

Among the three cases of interference resulting from two AC components, in the case of interference in which the AC components are the BM pattern and the prism pattern, moire occurring due to the interference between the two patterns can be resolved by techniques known in the prior art that are disclosed in, for example, JP 2002-351341 A, JP 2000-206529 A and JP 3007008 B. In the case of interference in which the AC components are the BM pattern and the wiring pattern, moire occurring due to the interference between the two patterns can be resolved by a technique known in the prior art that is disclosed in, for example, JP 2009-117683 A.

However, among the three cases of interference resulting from two AC components, in the case of interference in which the AC components are the wiring pattern and the prism pattern, and in the case of interference resulting from three AC components including the BM pattern, the wiring pattern, and the prism pattern, the occurrence of moire is not satisfactorily resolved.

Therefore, in the present invention, for at least those two cases, optimization of the wiring pattern is performed. In this way, the present invention provides a conductive film having a wiring pattern that can inhibit the occurrence of moire caused by two patterns including the wiring pattern and the prism pattern and by three patterns including the BM pattern, the wiring pattern, and the prism pattern and thus can inhibit the occurrence of moire caused when the three patterns are used.

In the display device 40 of the present embodiment constituted as above, for the moire occurring due to the interference between two patterns including the prism pattern 77 of the prism sheet 76 and the BM pattern 68 of the display unit 30, the prism pattern 77 and the BM pattern 68 can be optimized by techniques known in the prior art including the techniques disclosed in JP 2002-351341 A, JP 2000-206529 A and JP 3007008 B and the like.

Consequentially, herein, in optimizing the wiring pattern 24, the prism pattern 77 of the prism sheet 76 and the BM pattern 68 of the display unit 30 are regarded as being preset; both of the patterns are regarded as having been optimized; and the moire occurring due to the interference between both of the patterns is regarded as not being visually recognized.

Moreover, for the moire occurring due to the interference between two patterns including a predetermined BM pattern 68 of the display unit 30 and the wiring pattern 24 of the conductive film 10 or 11, the BM pattern 68 and the wiring pattern 24 can be optimized by techniques known in the prior art including the techniques disclosed in JP 2009-117683 A and the like or by techniques disclosed in Japanese Patent Application No. 2011-221432, Japanese Patent Application No. 2012-082706, Japanese Patent Application No. 2012-082711, and Japanese Patent Application No. 2012-166946 applied by the present applicant, and in this way, the occurrence of moire can be inhibited.

Accordingly, first, in a first embodiment of the present invention, for the moire occurring due to the interference between the wiring pattern 24 of the conductive film 10 or 11 and the prism pattern 77 of the prism sheet 76, the wiring pattern 24 is optimized, such that a difference (a frequency of moire) between peak spatial frequencies of a plurality of spectrum peaks of two-dimensional Fourier spectra of transmittance image data of the wiring pattern 24 and peak spatial frequencies of spectrum peaks up to the second-order term of two-dimensional Fourier spectra of transmittance image data of the prism pattern 77 becomes greater than 3 cycles/mm.

The moire occurring due to the interference between two patterns has intensity higher than that of the moire occurring due to the interference among three patterns, and is visually recognized more easily. Accordingly, in order to inhibit the moire occurring due to the interference between the wiring pattern 24 and the prism pattern 77, the wiring pattern is optimized first.

The peak intensity of the spectrum peak of the two-dimensional Fourier spectra is reduced as the order of the spectrum is heightened, and becomes about $\frac{1}{10}$ in the second-order term. The peak intensity of an order higher than the third-order becomes equal to or less than the above. Accordingly, even if the peak intensity of an order higher than the third-order is ignored, it does not result in visually recognized moire and does not cause a big problem. For this reason, in the prism pattern 77, only the peak spatial frequency up to the second-order term of the two-dimensional Fourier spectra is considered.

Figure 10A:
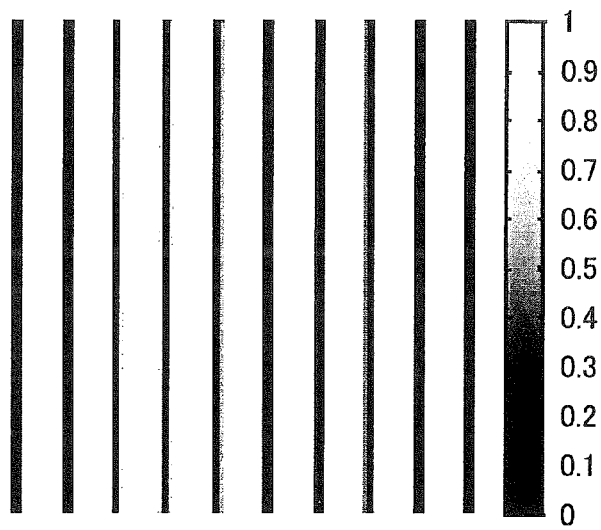
FIG. 10A is an example of a transmittance image of a prism sheet used in the present invention.
Figure 10B:
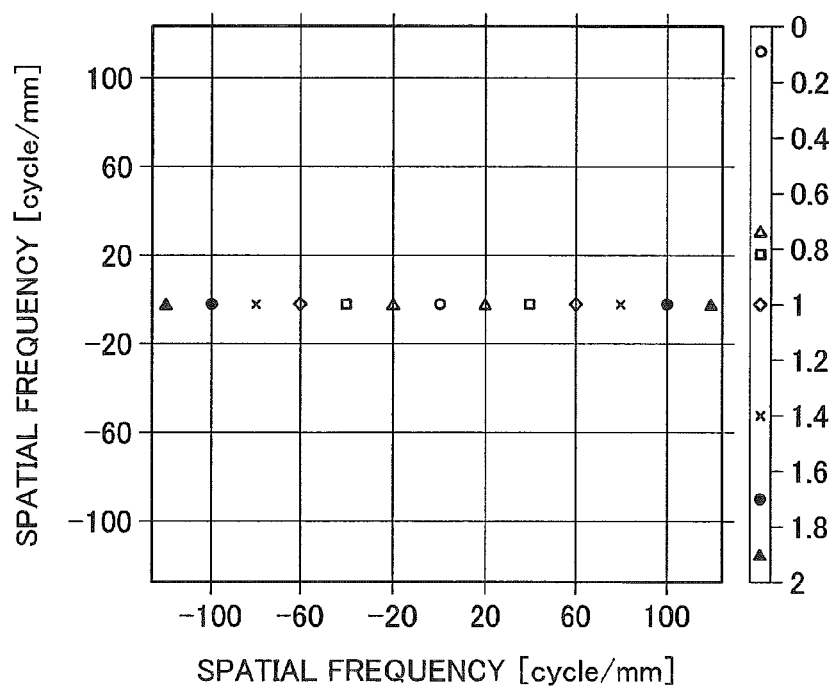
FIG. 10B is an example of an FFT image thereof.

FIG. 10(A) shows an example of a transmittance image of the prism sheet (PS). Herein, a transmittance distribution of the PS varies with the manufacturer of PS, and even in the same PS, it depends on viewing angle. In the present embodiment, as an example, a PS having a pitch of a microprism of 50 µm is described. FIG. 10(B) shows an FFT image of the transmittance image of the PS shown in FIG. 10(A) that is obtained by performing FFT processing on image data of the transmittance image. In the FFT image shown in FIG. 10(B), the spectrum peak is indicated by a reciprocal of the pitch of the microprism. Therefore, in the example shown in FIG. 10(B), the spectrum peak is indicated by 20 cycles/mm=(1 [mm]/(50 [µm]/[pitch]). When being indicated by absolute values of $\log_{10}$ (peak intensity), the peak intensities of the spectrum peaks are gradually reduced such as 0.09, 0.74, 0.82, 1, and 1.4 from the center. Accordingly, as is evident from this example, in terms of the appearance of moire, it is reasonable to consider the spectrum peak up to the second-order term since the peak intensity becomes about $\frac{1}{10}$. In this connection, if the spectrum peak up to the third-order term is considered, accuracy of calculation is improved, but it is not practical since it takes too much time for the calculation.

Therefore, in the prism pattern 77 of the present invention, the peak spatial frequencies of the spectrum peaks up to the second-order term of the two-dimensional Fourier spectra are considered.

In addition, the shorter the distance between spectrum peaks of two patterns on a spatial frequency space (coordinate), that is, the smaller the difference in peak spatial frequency of the spectrum peaks between two patterns, in other words, the lower the frequency of moire, the easier it becomes for the moire to be visually recognized. Consequentially, there is a frequency at which moire becomes visually recognizable for the first time. If the frequency is set to be a lowest frequency, moire is not visually recognized as long as a frequency thereof is higher than the lowest frequency.

Therefore, in the present invention, the difference (frequency of moire) in the entirety of peak spatial frequency between the two patterns is set to be greater than 3 cycles/mm. This is because "3 cycles/mm" is a value equal to or greater than the lowest frequency at which the moire can be visually recognized, and thus, the difference in the entirety of peak spatial frequency between the two patterns can be taken as a frequency higher than the lowest frequency.

Herein, in the present invention, even when the difference (frequency of moire) in the peak spatial frequency between the two patterns is within 3 cycles/mm, depending on the peak intensites of the spectrum peaks of the two patterns, moire is not visually recognized in some cases. However, as shown in FIGS. 8(A) and 8(B), between a case of viewing the prism pattern from the front thereof and a case of viewing the prism pattern from an oblique direction, there is a big difference in the peak intensity of the spectrum peak of the prism pattern. In other words, the peak intensity varies as the viewing angle varies. Accordingly, optimization based only on the peak frequency without considering the peak intensity is excellent and more reliable.

Next, in a second embodiment of the present invention, for moire occurring due to the interference among three patterns including a predetermined prism pattern 77 of the prism sheet 76 of the backlight unit 42, a predetermined BM pattern 68 of the display unit 30, and the wiring pattern 24 of the conductive film 10 or 11, the wiring pattern 24 is optimized, such that the lowest frequency at which the moire is visually recognized becomes higher than the lowest frequency of moire occurring due to the interference between the wiring pattern 24 and the BM pattern 68.

The reason is as follows. If the lowest frequency of the moire visually recognized due to the interference among the three patterns is higher than the lowest frequency of the moire occurring due to the interference between the wiring pattern and the BM pattern, even if the prism pattern and a wiring pattern is combined, the prism pattern and the BM pattern is combined, or the prism pattern, the wiring pattern, and the BM pattern are combined, moire is not visually recognized.

The moire occurring due to the interference among three patterns including the prism pattern 77, the BM pattern 68, and the wiring pattern 24 can be regarded as moire occurring due to the interference between a repeating pattern of moire, which occurs due to the interference between two patterns out of the three patterns, for example, two patterns including the BM pattern 68 and the wiring pattern 24, and a repeating pattern of the one remaining pattern out of the three patterns, for example, the prism pattern 77.

Therefore, if the lowest frequency of the moire visually recognized due to the interference among the aforementioned three patterns (herein, the lowest frequency is determined by a difference between the frequencies (peak frequencies) of the frequency peaks (spectrum peaks) of moire, which occurs due to the interference between two patterns out of the three patterns, for example, the BM pattern 68 and the wiring pattern 24, and the peak frequencies of the one remaining pattern out of the three patterns, for example, the prism pattern 77) is higher than the lowest frequency of the moire occurring due to the interference between two patterns including the BM pattern 68 and the wiring pattern 24, the three patterns can be optimized. Consequentially, needless to say, for the display device in which the prism pattern 77 and the BM pattern 68 have been optimized, the wiring pattern 24 can be optimized.

Moreover, even in the moire occurring due to the interference between the wiring pattern 24 and the BM pattern 68, a difference between the peak spatial frequencies of the wiring pattern 24 and the peak spatial frequencies of a plurality of spectrum peaks of the two-dimensional Fourier spectra of the transmittance image data of the BM pattern 68 is preferably greater than 3 cycles/mm.

In addition, even in the moire occurring due to the interference between the BM pattern 68 and the prism pattern 77, a difference between the peak spatial frequencies of the BM pattern and the peak spatial frequencies of the prism pattern 77 is preferably greater than 3 cycles/mm.

In this way, the moire between two patterns is not visually recognized in any case.

The display device to which the conductive film of the present invention is applied is basically constituted as above.

Next, the procedure of evaluation and optimization of moire appearance of the wiring pattern of the conductive film of the present invention with respect to a predetermined prism pattern of the prism sheet of the backlight unit of the display device and a predetermined BM pattern of the display unit thereof will be described. That is, procedure of determining the wiring pattern, which is optimized such that moire with respect to a predetermined prism pattern of the prism sheet of the backlight unit of the display device and a predetermined BM pattern of the display unit thereof is not visually recognized by a human being, in the conductive film of the present invention will be described below.

Figure 11:
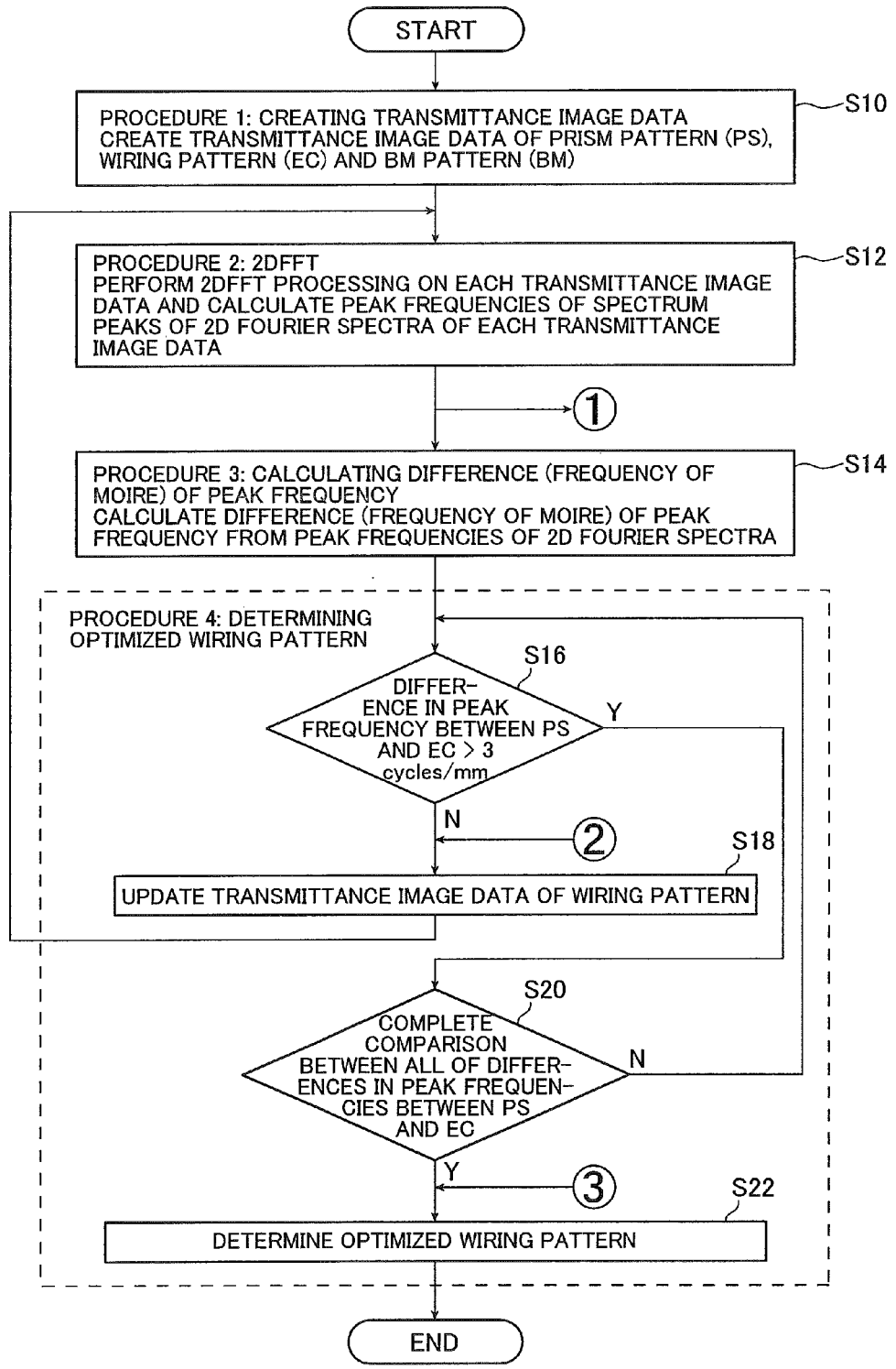
FIG. 11 is a flowchart showing an example of a wiring pattern determination method for a conductive film according to the present invention.

As shown in FIG. 11, in a first embodiment of a wiring pattern determination method for a conductive film of the present invention, peak spatial frequencies of the respective spectrum peaks up to the second-order term of the prism (microprism array) pattern of the prism sheet of the backlight unit of the display device and peak spatial frequencies of a plurality of spectrum peaks of the wiring pattern of the conductive film are calculated by means of frequency analysis using Fast Fourier Transform (FFT) of the prism pattern and the wiring pattern. Then from the calculated peak spatial frequencies of the respective spectrum peaks of the two patterns, a difference in the peak spatial frequency of the spectrum peak between the two patterns is calculated. Then, a wiring pattern satisfying a condition that all of the calculated differences in the peak spatial frequencies between the respective spectrum peaks are greater than 3 cycles/mm is determined to be a wiring pattern which is optimized to prevent first moire from being visually recognized.

Figure 12:
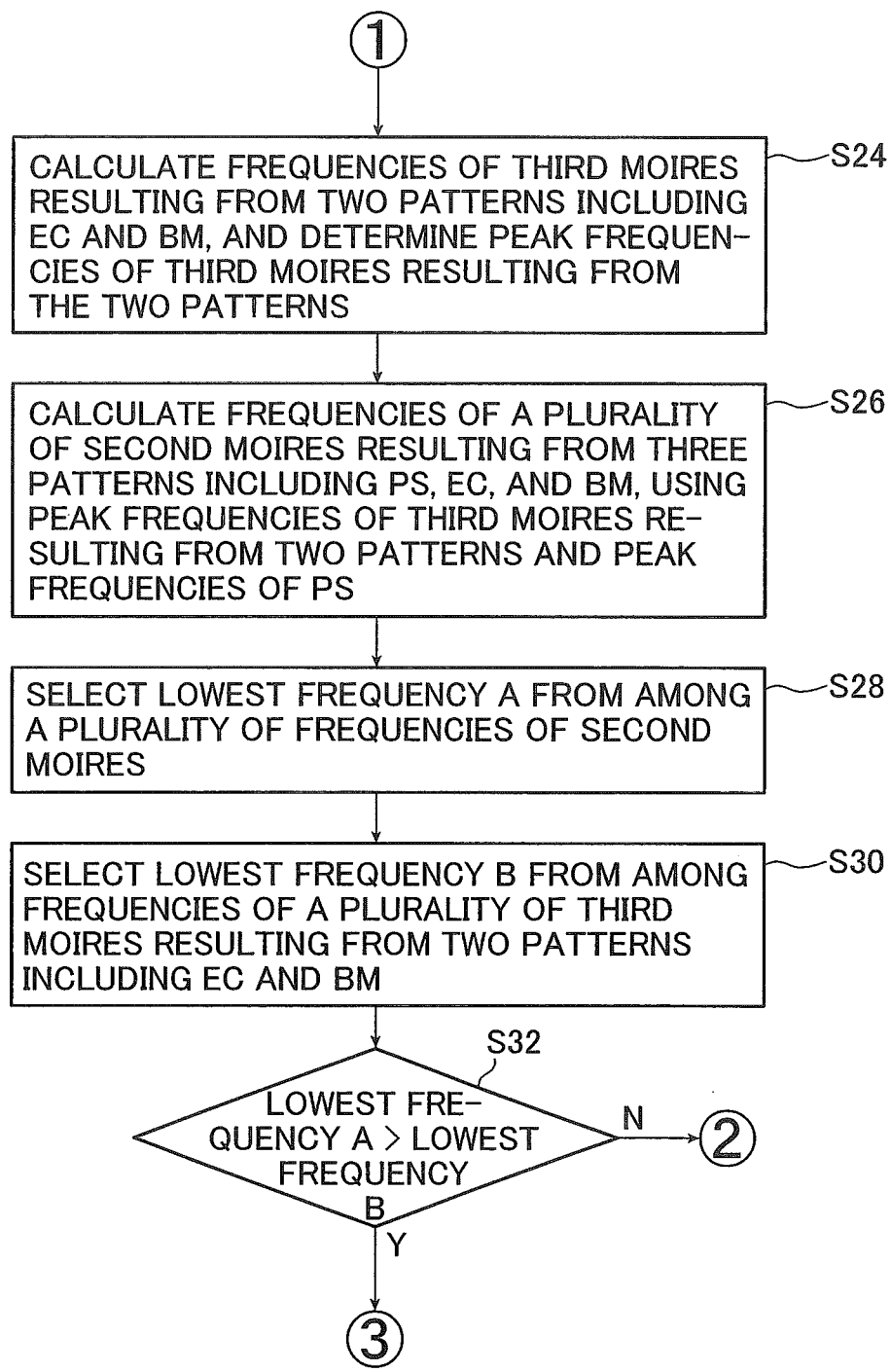
FIG. 12 is a flowchart showing another example of the wiring pattern determination method for a conductive film according to the present invention.

As shown in FIG. 12, in a second embodiment of the wiring pattern determination method for a conductive film of the present invention, frequency analysis using Fast Fourier Transform (FFT) of three patterns including the prism pattern of the prism sheet of the backlight unit of the display device, the pixel array (BM) pattern of the display unit of the display device, and the wiring pattern of the conductive film is performed. In this way, frequencies of second moires visually recognized due to the interference among the three patterns are calculated, and among the calculated frequencies of the second moires, the lowest frequency of the second moires is determined. In addition, frequencies of third moires occurring due to the interference between the wiring pattern and the BM pattern are calculated, and among the calculated frequencies of the third moires, the lowest frequency of the third moires is determined. Then, a wiring pattern satisfying a condition that the lowest frequency of the second moires is higher than the lowest frequency of the third moires is determined to be a wiring pattern which is optimized such that the second moire is not visually recognized.

In these methods of the present invention, FFT is generally used for the frequency of moire. However, depending on the usage of FFT, the frequency of a target is greatly varied. Accordingly, the following procedure is specified.

First, the first embodiment of the wiring pattern determination method for a conductive film of the present invention will be described with reference to FIG. 11.

FIG. 11 is a flowchart showing an example of the first embodiment of the wiring pattern determination method for a conductive film of the present invention.

In the example shown in FIG. 11, the first and second embodiments of the method of the present invention are not independently performed, and the second embodiment of the method of the present invention is performed after the first embodiment thereof. However, the method of the present invention is not limited thereto, and needless to say, the embodiments may be independently performed.

In the first embodiment of the method of the present invention, first, as Procedure 1, transmittance image data of the prism pattern, the wiring pattern, and the BM pattern is created. That is, as shown in FIG. 11, in Step S10, transmittance image data of the prism pattern 77 (see FIG. 8) of the prism sheet 76 of the backlight unit 42 of the display device 40 shown in FIG. 5, transmittance image data of a wiring pattern 82 (thin metal wires 14) (see FIG. 13(B)) of a conductive film 80, and transmittance image data of the BM pattern 68 (BM 64) (see FIG. 7) of the display unit 30 are created and obtained. Herein, when the transmittance image data of the BM pattern 68, the transmittance image data of the wiring pattern 82, and the transmittance image data of the prism pattern 77 have already been prepared or accumulated, the transmittance image data may be obtained from the prepared or accumulated data. The reason why the transmittance image data of the prism pattern, the wiring pattern, and the BM pattern is created is that the pitch of each of the patterns needs to be clearly ascertained to predict moire.

As shown in FIG. 13(A), the prism pattern 77 of the prism sheet 76 can be in the form of a pattern of parallel oblique lines having a predetermined pitch inclining by a predetermined angle, for example, 50°. In the present invention, the image data of the microprism array 75, that is, the transmittance image data of the prism pattern 77 is not limited to the image data shown in FIG. 13(A), and the angle of inclination, the pitch, or the cross-sectional shape of the microprism array 75 may be arbitrarily set.

Meanwhile, as shown in FIG. 13(B), the wiring pattern 82 of the conductive film 80 can be in the form of, for example, square lattices that are composed of thin metal wires 14 to be wiring and incline by 45° [deg].

As shown in FIG. 13(C) and FIG. 13(D) which is a partial enlarged view of FIG. 13(C), the BM pattern 68 of the display unit 30 can be in the form of, for example, a pattern in which each of the pixels 62 is composed of sub-pixels 62r, 62g, and 62b of three colors RGB. However, when a single color is used, and for example, when only the sub-pixel 62g of G-channel is used, the transmittance image data of R-channel and B-channel is preferably set to be 0. In the present invention, the image data of the BM 64, that is, the transmittance image data of the BM pattern 68 is not limited to the image data shown in FIG. 13(C) in which the BM 64 has rectangular openings (sub-pixels 62r, 62g, and 62b). As long as the BM pattern is a usable pattern, the BM 64 may not have rectangular openings, and a BM pattern having any type of BM openings may be designated and used. For example, the opening is not limited to a simple rectangular shape, and may have an intricately doglegged shape or a hook shape.

Herein, the size of the transmittance image data of the prism pattern 77, the wiring pattern 82, and the BM pattern 68 is specified to be, for example, 4096 (pixels)×4096 (pixels). Furthermore, in order to prevent or reduce periodic artifacts at the time of performing the FFT processing of Procedure 2 which will be described later, each of images of the prism pattern 77, the wiring pattern 82, and the BM pattern 68 is preferably subjected to flipping processing in all directions (8 directions) as shown in FIG. 14. The size of a new image having undergone the flipping processing is preferably set such that the image is within an area (one side 8192 (pixels)=4096 (pixels)×2) corresponding to four images surrounded by a dotted line in FIG. 14.

Thereafter, as Procedure 2, the transmittance image data created in Procedure 1 is subjected to two-dimensional fast Fourier transform (2DFFT (base 2)). That is, as shown in FIG. 11, in Step S12, the transmittance image data of each of the prism pattern 77, the wiring pattern 82, and the BM pattern 68 created in Step S10 is subjected to the 2DFFT processing (base 2), and peak frequencies of a plurality of spectrum peaks of two-dimensional Fourier spectra of the transmittance image data of each of the prism pattern 77, the wiring pattern 82, and the BM pattern 68 are calculated.

Herein, intensity characteristics of each of the two-dimensional Fourier spectra of the prism pattern 77, the wiring pattern 82 and the BM pattern 68 are determined, and the positions of the spectrum peaks in the determined intensity characteristics on frequency coordinates, that is, the peak positions are determined to be peak frequencies, although this process is not illustrated in the drawing.

At this time, as described above, for the prism pattern 77, the peak spatial frequencies of the spectrum peaks up to the second-order term of the two-dimensional Fourier spectra may be considered.

Herein, the peak frequency of each of the spectrum peaks of the prism pattern 77, the wiring pattern 82, and the BM pattern 68 is calculated and obtained as below.

Figure 15:
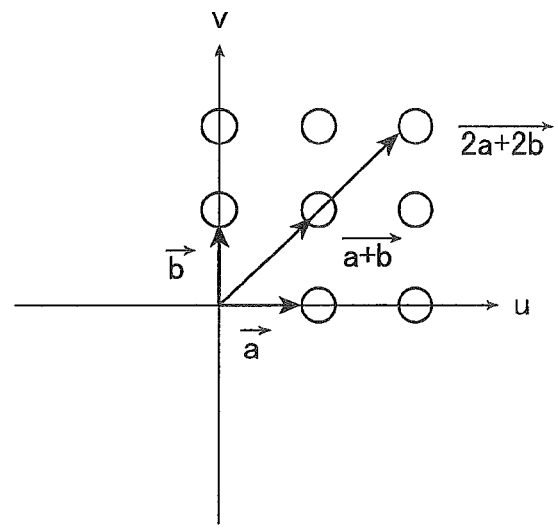
FIG. 15 is an example of a graph showing positions of spectrum peaks of the pixel array pattern of the display unit shown in FIG. 13C.

First, in calculating peaks for obtaining the peak frequency, from the basic frequency of the prism pattern 77, the wiring pattern 82, and the BM pattern 68, spectrum peaks (frequency peaks) are calculated. This is because the transmittance image data subjected to the 2DFFT processing is discrete values, and thus the peak frequency depends on the reciprocal of the image size. As shown in FIG. 15, the positions of spectrum peaks can be expressed by combination of bars a and b which are independent two-dimensional basic frequency vector components. Accordingly, naturally, the obtained peak positions form a lattice shape. FIG. 15 is a graph showing the spectrum peak positions in case of the BM pattern 68, but the spectrum peak positions in the prism pattern 77 and the wiring pattern 82 can be determined in the same way.

Figure 16:
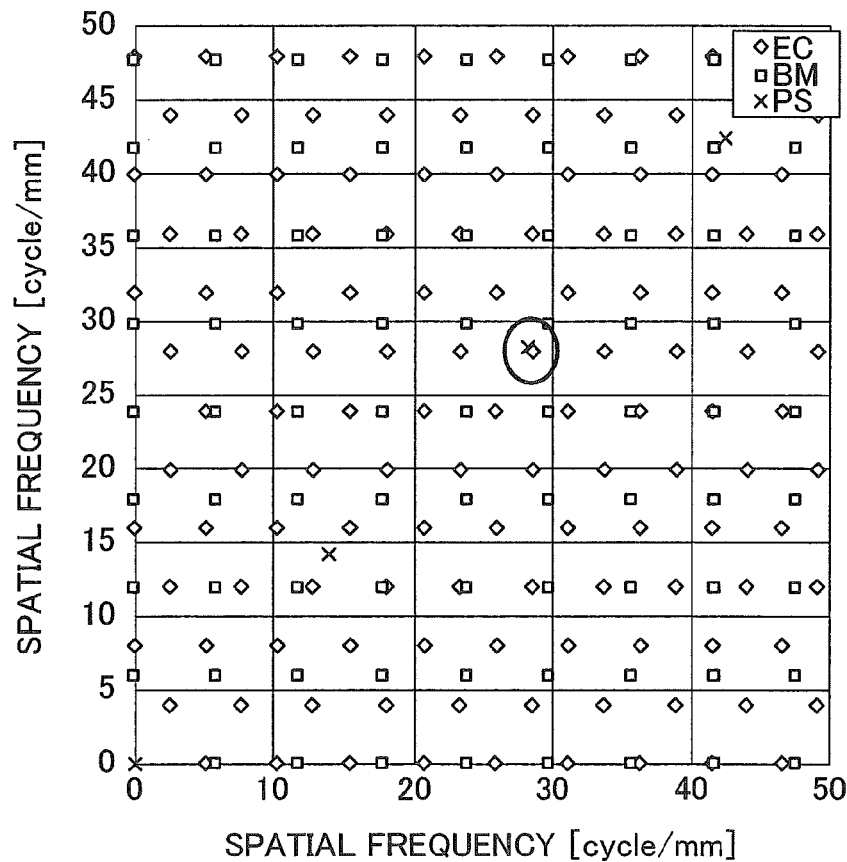
FIG. 16 is an example of a graph in which peak frequencies of the microprism array pattern (PS) of the prism sheet, the wiring pattern (EC) of the conductive film, and the pixel array pattern (BM) of the display unit, which are determined by the wiring pattern determination method shown in FIG. 11, are plotted on spatial frequency coordinates.

FIG. 16 shows a graph in which the thus obtained peak frequencies of each of the spectrum peaks (frequency peaks) of the prism pattern 77, the wiring pattern 82, and the BM pattern 68 are plotted on two-dimensional spatial frequency coordinates. In the drawing, rhomboids show peak frequencies of the wiring pattern EC of the conductive films 10 or 11, quadrangles show peak frequencies of the BM pattern BM of the display unit 30, and crosses show peak frequencies of the prism pattern PS of the prism sheet 76. As is evident from the example shown in FIG. 16, the BM pattern 68 is a lattice-like pattern inclining by a predetermined angle (approximately 60°) with respect to the lattice-like wiring pattern 82, and the prism pattern 77 is a parallel pattern inclining by a predetermined angle (approximately 45°) with respect to the wiring pattern 82.

Subsequently, as Procedure 3, a difference in the peak frequency between two patterns, that is, the frequency of first moire is calculated. Herein, for example, when there are two kinds of regular patterns such as the prism pattern 77, the wiring pattern 82, and the BM pattern 68, the frequency of moire is expressed as a difference between peaks represented by an integer of the basic spatial frequency characteristics of each of the patterns or expressed as a sum of the peaks (see FIG. 15).

As shown in FIG. 11, in Step S14, a difference in peak frequency, which is calculated in Step S12, of two-dimensional Fourier spectra between two patterns among the prism pattern 77, the wiring pattern 82, and the BM pattern 68, that is, the frequencies of the moire is calculated.

In the actual space, the moire is caused by the multiplication of the transmittance image data of two patterns among the prism pattern 77, the wiring pattern 82, and the BM pattern 68. Consequentially, in the frequency space, convolution integral thereof is performed. However, since the peak frequencies of each of the two-dimensional Fourier spectra of the prism pattern 77, the wiring pattern 82, and the BM pattern 68 are calculated in Step S12, a difference (an absolute value of the difference) in the peak frequency between the two patterns is calculated. The calculated difference in the peak frequency between the two patterns can be taken as a frequency of moire.

Herein, the difference of the peak frequencies of the intensity characteristics of the two-dimensional Fourier spectra of two patterns among the prism pattern 77, the wiring pattern 82, and the BM pattern 68 corresponds to the relative distance between the peak positions on the frequency coordinates of the respective spectrum peaks of the two patterns in the intensity characteristics obtained by superimposing the intensity characteristics of the two-dimensional Fourier spectra.

Each of the prism pattern 77, the wiring pattern 82, and the BM pattern 68 has a plurality of spectrum peaks in the two-dimensional Fourier spectra. Therefore, the difference of spectrum (frequency) peaks (difference between peak frequencies) that is a value of the relative distance between two spectrum peaks among the above spectrum peaks, that is, the frequency of moire is obtained in a plural number. Consequentially, if the two patterns have a large number of spectrum peaks in the two-dimensional Fourier spectra, the obtained frequency information on moire is also increased, and as a result, it takes a long period of time for calculation. In this case, for each of the spectrum peaks in the two-dimensional Fourier spectra of the respective patterns, the peak intensity may be determined in advance, and only the peaks having a high intensity may be selected. For example, as described above, for the prism pattern 77, the spectrum peaks up to the second-order term may be selected in advance. For the wiring pattern 82 and the BM pattern 68, for example, standard visual response characteristics of a human being (see FIG. 20) may be subjected to convolution, and only the peaks having intensity equal to or greater than a specific value may be selected in advance. In this case, because only the difference between the selected peaks is calculated, the time taken for calculation can be shortened.

Thereafter, as Procedure 4, a wiring pattern optimized in terms of moire appearance is determined.

Herein, as shown in FIG. 11, in Step S16, a difference, which is calculated in Step S14, between peak frequencies of spectrum peaks of the prism pattern (PS) 77 and the wiring pattern (EC) 82 is compared with 3 cycles/mm, and whether or not the difference is greater than 3 cycles/mm is determined.

As a result, for example, in the graph of FIG. 16 in which the peak frequencies of the respective spectrum peaks (frequency peaks) of the prism pattern 77, the wiring pattern 82, and the BM pattern 68 are plotted on two-dimensional spatial frequency coordinates, in the position surrounded by a circle, the peak frequency up to the second-order of the spectrum peak of the prism pattern EC indicated by a cross is close to the peak frequency of the wiring pattern EC indicated by a rhomboid. Accordingly, the difference becomes equal to or less than 3 cycles/mm, and visually recognized moire occurs.

In Step S16, instead of the difference in the peak frequency between the prism pattern (PS) 77 and the wiring pattern (EC) 82, or alternatively, in addition to the difference, either the difference, which is obtained in Step S14, in peak frequency between spectrum peaks of the wiring pattern (EC) 82 and the BM pattern (BM) 68 or the difference, which is obtained in Step S14, in peak frequency between the spectrum peaks of the prism pattern (PS) 77 and the BM pattern (BM) 68 may be compared with 3 cycles/mm, and whether or not the difference is greater than 3 cycles/mm may be determined.

When the difference of the peak frequency is equal to or less than 3 cycles/mm, the process moves on to Step S18 in which the transmittance image data of the wiring pattern 82 is updated to transmittance image data of a new wiring pattern, and then the process returns to Step S12.

Herein, the new wiring pattern to be updated may be prepared in advance or newly created. When the wiring pattern is newly created, one or more among the rotation angle, the pitch, and the pattern width of the transmittance image data of the wiring pattern may be changed, or the shape or the size of the opening of the wiring pattern may be changed. Moreover, randomness may be given thereto.

Subsequently, Step S12 as a step of calculating the peak frequency, Step S14 as a step of calculating the difference of peak frequency, Step S16 as a step of comparing the difference in peak frequency between PS and EC (and/or the difference in peak frequency between EC and BM) with 3 cycles/mm, and Step S18 as a step of updating the transmittance image data of the wiring pattern are repeated until the difference in peak frequency between PS and EC becomes greater than 3 cycles/mm.

In contrast, when the difference in peak frequency between PS and EC is greater than 3 cycles/mm, the process moves onto Step S22. In this step, the wiring pattern 82 is determined to be an optimized wiring pattern and set to be the wiring pattern 24 of the conductive film 10 or 11 of the present invention.

When only the first embodiment of the wiring pattern determination method for a conductive film of the present invention is performed, so as to compare the difference in peak frequency between the prism pattern (PS) 77 and the wiring pattern (EC) 82 with 3 cycles/mm in Step S16 of Procedure 4 and to determine whether or not the difference is greater than 3 cycles/mm, only the peak frequency of the prism pattern (PS) 77 and the wiring pattern (EC) 82 or the difference of the peak frequency (frequency of moire) needs to be calculated. Therefore, Step S10 as a step of creating transmittance image data of the BM pattern (BM) 68 of the display unit 30, Step S12 as a step of calculating the peak frequency of the BM pattern (BM) 68, and Step S14 as a step of calculating the difference in the peak frequency between the prism pattern (PS) 77 or the wiring pattern (EC) 82 and the BM pattern (BM) 68, that is, a step of calculating the frequency of moire do not need to be performed. Consequentially, it is preferable to skip these steps relating to the BM pattern (BM) 68.

However, when the first embodiment and the second embodiment of the wiring pattern determination method for a conductive film of the present invention are performed in this order as shown in FIG. 11, it is preferable to perform the above steps relating to the BM pattern (BM) 68 in advance.

The first embodiment of the wiring pattern determination method for a conductive film according to the present invention is completed as above, and as a result, the conductive film of the present invention having the optimized wiring pattern which can suppress the occurrence of moire even when being superimposed on the BM pattern of a display unit of a display device including a backlight having a prism sheet and is excellent in appearance of moire can be prepared.

Herein, when the first embodiment of the method of the present invention is performed, the appearance of moire occurring between the BM pattern (BM) and the prism pattern (PS) in the display unit has preferably been optimized by the techniques of the prior art described above, and furthermore, the appearance of moire occurring between the wiring pattern (EC) and the BM pattern (BM) has preferably been optimized by the techniques of the prior art described above or by the techniques described in the aforementioned specifications of the applications applied by the present applicant. When at least one of the appearance of moire described above has not yet been optimized, in the first embodiment, the difference in peak frequency between BM and PS or the difference in peak frequency between BM and EC may be compared with 3 cycles/mm so as to optimize the appearance of the moire, or alternatively, needless to say, the appearance of moire may be optimized by the techniques of the prior art described above or by the techniques described in the aforementioned specifications of the applications applied by the present applicant.

Next, the second embodiment of the wiring pattern determination method for a conductive film of the present invention will be described with reference FIG. 12.

FIG. 12 is a flowchart showing an example of the second embodiment of the wiring pattern determination method for a conductive film of the present invention.

The second embodiment of the method of the present invention shown in FIG. 12 is performed after the first embodiment of the method of the present invention shown in FIG. 11. Accordingly, the second embodiment is performed on the premise that Step S10 as a step of creating the respective transmittance image data of the prism pattern 77 of the prism sheet 76, the wiring pattern 82 of the conductive film 80, and the BM pattern 68 of the display unit 30 and Step S12 as a step of calculating peak frequencies of the respective patterns including the prism pattern 77, the wiring pattern 82, and the BM pattern 68 by 2DFFT have been completed.

Figure 17A:
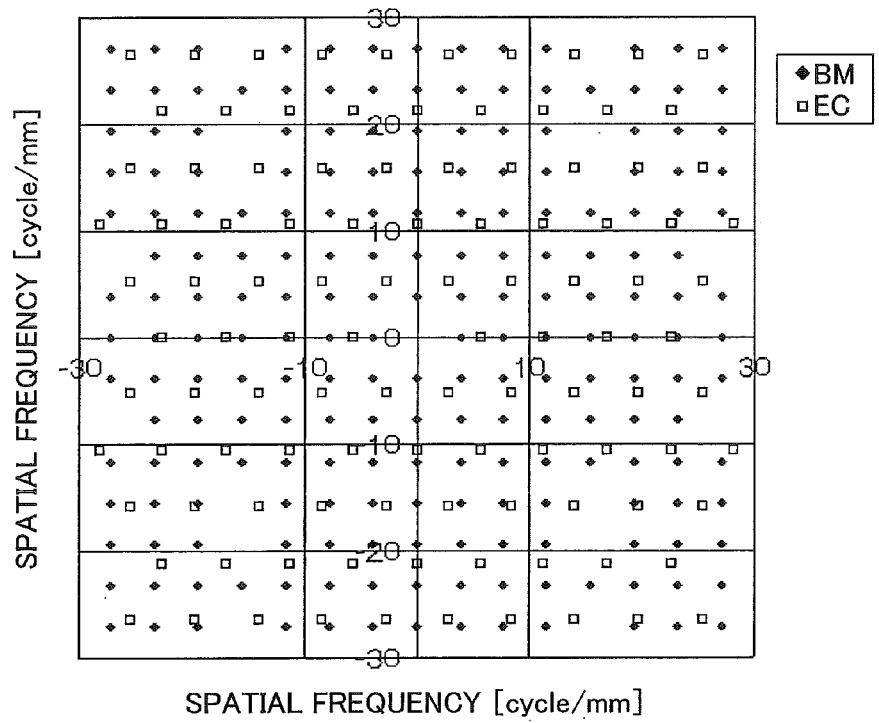
FIG. 17A is an example of a graph in which peak frequencies of the pixel array pattern (BM) of the display unit and the wiring pattern (EC) of the conductive film, which are subjects of the present invention, are plotted on spatial frequency coordinates.

FIG. 17(A) shows an example of a graph in which peak frequencies, which are calculated in Step S12, of the BM pattern (BM) 68 and the wiring pattern (EC) 82 are plotted on spatial frequency coordinates. In FIG. 17(A), black circles indicate the peak frequencies of the BM pattern (BM) 68, and white quadrangles indicate the peak frequencies of the wiring pattern (EC) 82 and show that the wiring pattern (EC) 82 is a lattice-like pattern inclining by a predetermined angle with respect to the lattice-like BM pattern (BM) 68.

Figure 18:
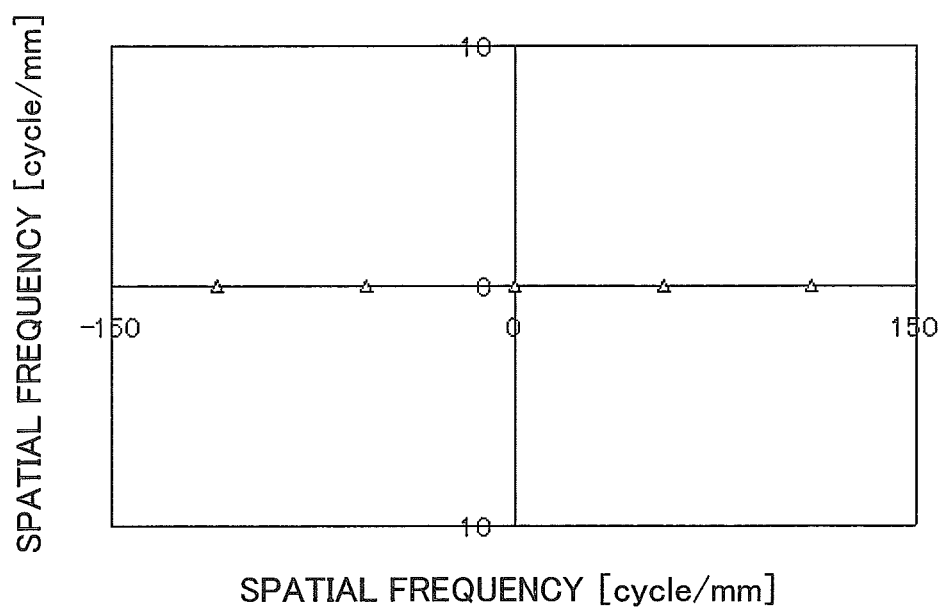
FIG. 18 is an example of a graph in which peak frequencies of the microprism array pattern (PS) of the prism sheet that is a subject of the present invention are plotted on spatial frequency coordinates.

FIG. 18 shows an example of a graph in which the peak frequencies, which are calculated in Step S12, of the prism pattern (PS) 77 are plotted on spatial frequency coordinates. FIG. 18 shows that the prism pattern (PS) 77 is a parallel pattern.

In Step S12, frequency characteristics of PS are investigated, and peak frequencies of PS are calculated. In this step, peak intensity is not necessary as described above, and only peak frequency positions need to be ascertained. Accordingly, only the pitch of PS needs to be ascertained in this step. FIG. 18 shows an example in which the pitch of PS is 20 µm. As described above, in this case, the peak frequencies of PS just need to be calculated up to the second-order term of the spectrum peak.

Thereafter, as shown in FIG. 12, in Step S24 following Step S12, from the peak frequencies, which are calculated in Step S12, of spectrum peaks of two patterns including the wiring pattern (EC) and the BM pattern (BM), the difference in the peak frequency between spectrum peaks of two patterns including EC and BM is calculated, and the frequency of third moire occurring due to the interference between the two patterns including EC and BM is calculated. The calculated frequency of third moire is extracted (calculated) as the peak frequency (frequency peak) of the third moire.

For example, in Step S24, from the peak frequencies, which are calculated by 2DFFT in Step S12, of the spectrum peaks of two patterns including EC and BM and peak intensities (vector intensities: see FIG. 15) which is obtained concurrently with the peak frequencies, the difference (absolute value) in the peak frequency between two patterns including EC and BM is calculated, and a product (absolute value) of peak vector intensities of two patterns including EC and BM is calculated. The visual response characteristics of a human being (see FIG. 20) are applied to the difference in the peak frequency between two patterns including EC and BM and the product of the peak vector intensities calculated as above, that is, the visual response characteristics are subjected to convolution (convolution integral) together with the difference and the product, thereby calculating the frequency and intensity of moire having intensity equal to or greater than a specific level.

Figure 17B:
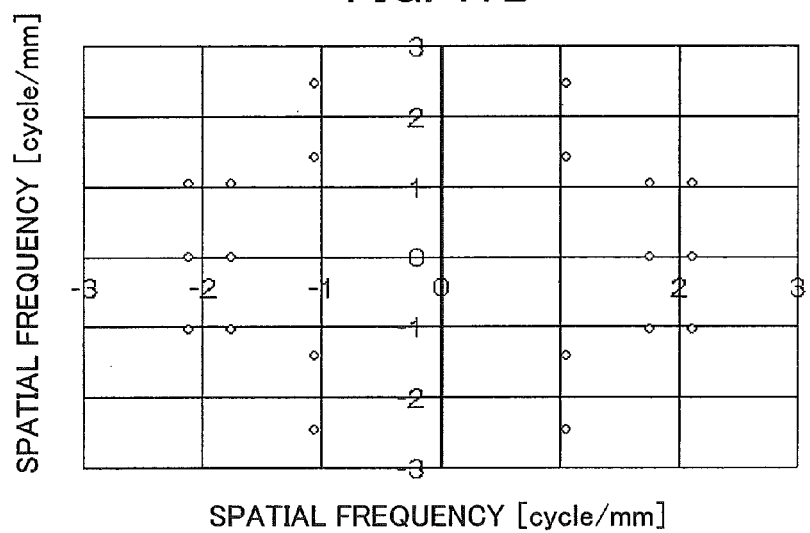
FIG. 17B is an example of a graph in which frequencies of moire of the pixel array pattern (BM) and the wiring pattern (EC) are plotted on spatial frequency coordinates.

In this way, as shown in FIG. 17(B), only the third moire having intensity equal to or greater than a specific level remains.

FIG. 17(B) shows frequencies of the third moires having intensity equal to or greater than a predetermined level, among moires occurring due to the interference between two patterns including EC and BM having the peak frequencies shown in FIG. 17(A).

The frequencies of the third moires having intensity equal to or greater than a predetermined level that are calculated as above can be determined to be peak frequencies of the third moires.

Then in Step S26, a difference between the respective peak frequencies, which are calculated in Step S12, of PS shown in FIG. 18 and the respective peak frequencies, which are calculated in Step S24, of the third moires occurring due to the interference between two patterns including EC and BM shown in FIG. 17(B) is calculated, and frequencies of a plurality of second moires occurring due to the interference among three patterns including PS, EC, and BM are calculated.

Figure 19:
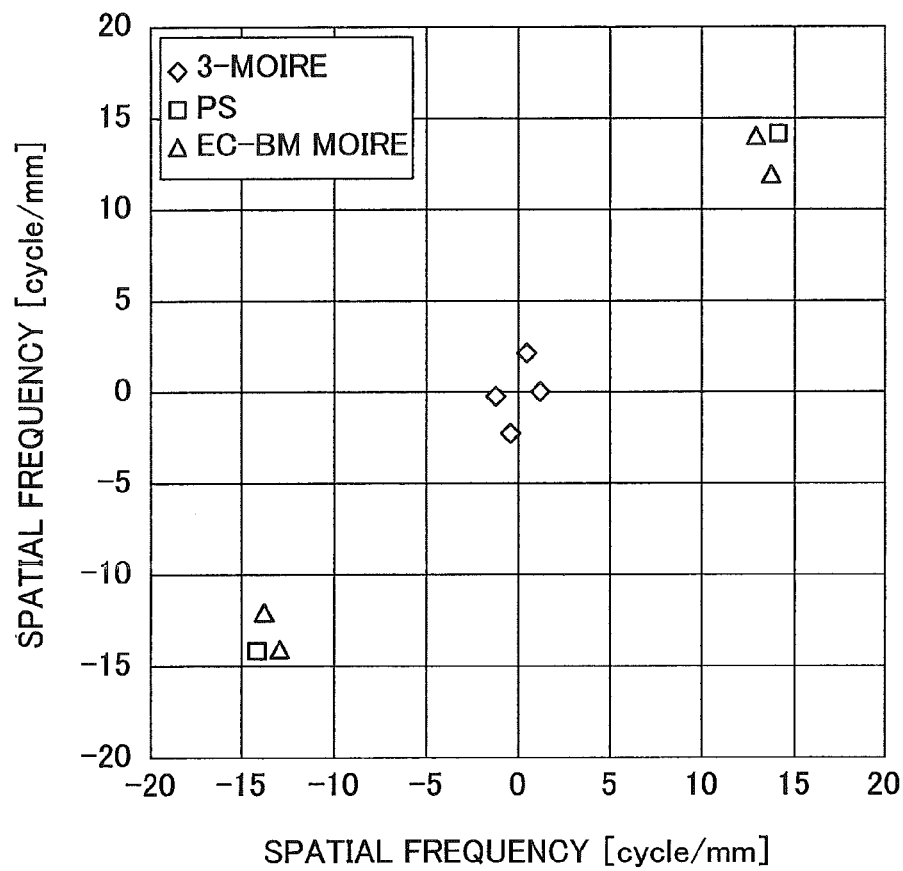
FIG. 19 is an example of a graph of frequencies of moire of three patterns (3-MOIRE) including the microprism array pattern of the prism sheet, the wiring pattern of the conductive film, and the pixel array pattern of the display unit, frequencies of moire of two patterns (2-MOIRE) including the wiring pattern and the pixel array pattern, and peak frequencies of the microprism array pattern (PS), that are calculated in the wiring pattern determination method shown in FIG. 11.

FIG. 19 shows a graph in which the frequencies, which are obtained in Step S26 from each of the peak frequencies of three patterns including PS, EC, and BM shown in FIG. 16, of the second moires occurring due to the interference among three patterns including PS, EC, and BM, the frequencies, which are obtained in Step S24, of the third moires occurring due to the interference between two patterns including EC and BM, and the peak frequencies of PS that are obtained in Step S12 are plotted on two-dimensional spatial frequency coordinates. In FIG. 19, rhomboids indicate frequency peaks of the second moires occurring due to the interference among three patterns, quadrangles indicate frequency peaks of PS, and triangles indicate frequency peaks of the third moires occurring due to the interference between two patterns including EC and BM.

As shown in FIG. 19, the frequency peaks of the second moires occurring due to the interference among three patterns gather in the vicinity of the origin, and the frequency peaks of the third moires occurring due to the interference between two patterns are close to the frequency peaks of PS. This shows that the second moires are visually recognized, and accordingly, the following steps are performed in the present embodiment.

In Step S28, from among the frequencies, which are calculated in Step S26, of a plurality of second moires occurring due to the interference among three patterns including the prism pattern (PS), the wiring pattern (EC), and the BM pattern (BM), a lowest frequency A of the second moires is selected.

Meanwhile, in Step S30, from among frequencies, which are calculated in Step S24, of a plurality of third moires occurring due to the interference between two patterns including the wiring pattern (EC) and the BM pattern (BM), a lowest frequency B of the third moires is selected. That is, as described above, from among the frequencies, which are obtained in Step S24, of the third moires occurring between BM and EC, for example, the frequencies of the third moires occurring between BM and EC shown in FIG. 17(B), the lowest frequency is selected, and thereby, the lowest frequency can be determined to be the lowest frequency B of the third moires occurring due to the interference between two patterns including BM and EC.

Subsequently, in Step S32, the lowest frequency A of the second moires that has been selected in Step S28 is compared with the lowest frequency B of the third moires that has been selected in Step S30, and whether or not the lowest frequency A of the second moires is higher than the lowest frequency B of the third moires is determined.

When it is determined that the lowest frequency A of the second moires is not higher than (is equal to or lower than) the lowest frequency B of the third moires, the process moves onto Step S18 shown in FIG. 11. In this step, the transmittance image data of the wiring pattern 82 is updated to transmittance image data of a new wiring pattern, and the process returns to Step S12.

Thereafter, Step S12 shown in FIG. 11 that is a step of calculating the respective peak frequencies of three patterns including PS, EC and BM, the respective steps shown in FIG. 12 that are Step S24 of calculating frequencies (peak frequencies) of the third moire of two patterns including EC and BM, Step S26 of calculating frequencies of the second moire, Step S28 of extracting the lowest frequency A, Step S30 of extracting the lowest frequency B of the third moire, and Step S32 of comparing the lowest frequency A with the lowest frequency B, and Step S18 shown in FIG. 11 that is a step of updating the transmittance image data of the wiring pattern are repeated until the lowest frequency A becomes higher than the lowest frequency B.

In contrast, when it is determined that the lowest frequency A is higher than the lowest frequency B in Step S32 of FIG. 12, the process moves onto Step S22 of FIG. 11. In this step, the wiring pattern 82 is determined to be an optimized wiring pattern and set to be the wiring pattern 24 of the conductive film 10 or 11 of the present invention.

The second embodiment of the wiring pattern determination method for a conductive film of the present invention is completed as above. As a result, the conductive film of the present invention having the optimized wiring pattern which can suppress the occurrence of moire of two patterns and three patterns even when being superimposed on the BM pattern of a display unit of a display device including a backlight having a prism sheet and is excellent in appearance of moire can be prepared.

In the second embodiment of the method of the present invention, Step S30 may be performed immediately after Step S24, that is, between Step S24 and Step S26. Moreover, Step S12 as a step of calculating peak frequencies of the prism pattern (PS) 77 may be performed between Step S24 and Step S26.

Figure 20:
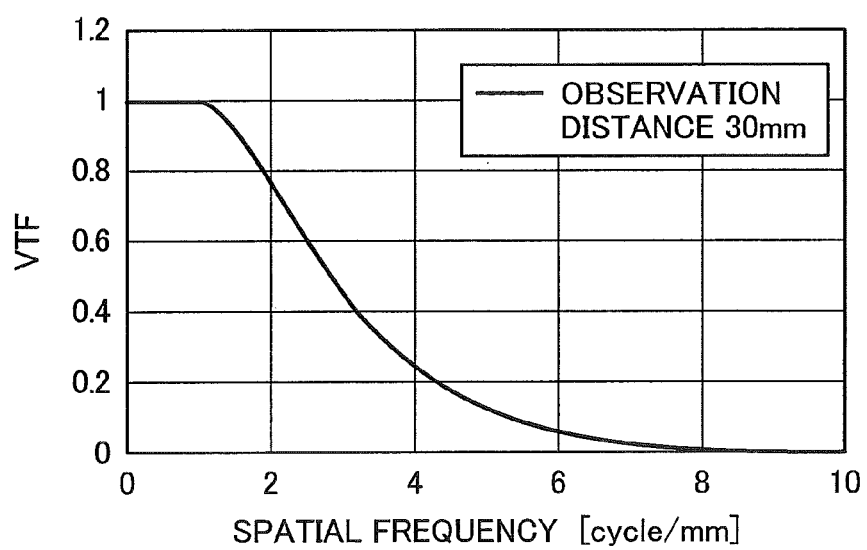
FIG. 20 is a graph showing an example of standard visual response characteristics of a human being.

As described above, in Step S24 shown in FIG. 12, it is preferable that from the peak frequencies, which are obtained by 2DFFT in Step S12, of the spectrum peaks of two patterns including EC and BM and peak intensities (vector intensities) which is obtained concurrently with the peak frequencies, the difference in the peak frequency between two patterns including EC and BM and a product of peak vector intensities of two patterns including EC and BM are calculated; and the frequencies of the third moires are calculated by applying the standard visual response characteristics of a human being shown in FIG. 20 to the difference in the peak frequency between the two patterns and the product of peak vector intensities of the two patterns, that is, by multiplication (convolution). In other words, the obtained difference in the peak frequency between two patterns including EC and BM and the product of the peak vector intensities of two patterns including EC and BM are convolved by a visual transfer function (VTF) shown in FIG. 20 that represents an example of the standard visual response characteristics of a human being. The visual transfer function is based on a Dooley Shaw function, and is for preventing attenuation in sensitivity of low-frequency components.

In the present invention, as the standard visual response characteristic of a human being, the Dooley Shaw function at an observation distance of 300 mm in a bright field of view is used. The Dooley Shaw function is a kind of visual transfer function (VTF) and is a typical function simulating the standard visual response characteristic of a human being. Specifically, the Dooley Shaw function corresponds to the square of a contrast ratio characteristic of brightness. The ordinate of the graph indicates the spatial frequency (unit: cycle/mm) and the abscissa indicates the VTF value (unit: dimensionless).

When the observation distance is 300 mm, the VTF value is constant (equal to 1) within a range of 0 cycle/mm to 1.0 cycle/mm and the VTF value tends to decrease as the spatial frequency increases. That is, the function acts as a low-pass filter that cuts off middle to high spatial frequency bands.

The actual visual response characteristic of a human being have a value smaller than 1 in the vicinity of 0 cycle/mm and has a so-called band-pass filter characteristic. However, in the present invention, as exemplified in FIG. 20, even in a spatial frequency band in which the frequency is extremely low, if the VTF value is set to 1, the attenuation in sensitivity of low-frequency components is prevented. Accordingly, it is possible to obtain an effect of suppressing periodicity resulting from the repeated arrangement of the wiring pattern 82.

Up to now, the conductive film, the display device and the touch panel comprising the conductive film, and the conductive film pattern determination method according to the present invention have been described based on various embodiments and examples. However, the present invention is not limited to the embodiments and examples described above. Needless to say, within a scope that does not depart from the gist of the present invention, modification or design change can be performed in various ways.

For example, in the second embodiment of the method of the present invention described above, peak frequencies of a plurality of third moires occurring due to the interference between two patterns including the wiring pattern (EC) and the BM pattern (BM) are calculated, and from the peak frequencies of the third moires and the peak frequencies of the prism pattern (PS), frequencies of a plurality of second moires occurring due to the interference among three patterns including PS, EC, and BM are calculated. However, the present invention is not limited thereto. The peak frequencies of the moires occurring due to the interference between two patterns including PS and EC may be calculated, and from the peak frequencies of the moires and the peak frequencies of the remaining BM, the frequencies of the second moires occurring due to the interference among three patterns including PS, EC, and BM may be calculated. Alternatively, the peak frequencies of the moires occurring due to the interference between two patterns including PS and BM may be calculated, and from the peak frequencies of the moires and the peak frequencies of the remaining EC, the frequencies of the second moires occurring due to the interference among three patterns including PS, EC, and BM may be calculated.

What is claimed is:

1. A conductive film installed on a display unit of a display device, comprising:
   a transparent substrate; and
   a conductive portion that is formed on at least one surface of the transparent substrate and formed of a plurality of thin metal wires,
   wherein the display unit has a pixel array pattern and a backlight unit having at least one prism sheet in which parallel microprism arrays having a minute triangular cross-sectional shape are formed,
   the conductive portion has a wiring pattern in which a plurality of openings formed by the plurality of thin metal wires is arranged in a form of mesh,
   the wiring pattern is superimposed on the pixel array pattern of the display unit, and
   regarding first moires occurring due to interference between the wiring pattern of the conductive portion and a microprism array pattern of the prism sheet at a side of the display unit, a difference between peak spatial frequencies of a plurality of spectrum peaks of two-dimensional Fourier spectra of transmittance image data of the wiring pattern and peak spatial frequencies of spectrum peaks up to a second-order term of two-dimensional Fourier spectra of transmittance image data of the microprism array pattern is greater than 3 cycles/mm.

2. A conductive film installed on a display unit of a display device, comprising:
   a transparent substrate; and
   a conductive portion that is formed on at least one surface of the transparent substrate and formed of a plurality of thin metal wires,
   wherein the display unit has a pixel array pattern and a backlight unit having at least one prism sheet in which parallel microprism arrays having a minute triangular cross-sectional shape are formed,
   the conductive portion has a wiring pattern in which a plurality of openings formed by the plurality of thin metal wires is arranged in a form of mesh,
   the wiring pattern is superimposed on the pixel array pattern of the display unit, and
   regarding second moires visually recognized due to interference among three patterns including the wiring pattern of the conductive portion, the pixel array pattern of the display unit, and a microprism array pattern of the prism sheet, a lowest frequency of the visually recognized second moires is higher than a lowest frequency of third moires occurring due to interference between the wiring pattern and the pixel array pattern.

3. The conductive film according to claim 1, wherein the pixel array pattern is a black matrix pattern.

4. The conductive film according to claim 1, wherein the at least one prism sheet is formed of two prism sheets each having the microprism array pattern orthogonal to the microprism array pattern of another prism sheet.

5. The conductive film according to claim 1, wherein the conductive portion has a first conductive portion that is formed on one surface of the transparent substrate and formed of a plurality of thin metal wires and a second conductive portion that is formed on another surface of the transparent substrate and formed of a plurality of thin metal wires, and the wiring pattern is formed by combining the first conductive portion with the second conductive portion.

6. The conductive film according to claim 5, further comprising:
a first protective layer that is disposed on the one surface and covers the first conductive portion; and
a second protective layer that is disposed on the another surface and covers the second conductive portion,
wherein at least one of a relative refractive index of the substrate with respect to the first protective layer and a relative refractive index of the substrate with respect to the second protective layer is equal to or greater than 0.86 and equal to or less than 1.15.

7. The conductive film according to claim 5, further comprising:
a first dummy electrode portion that is formed on the one surface and formed of a plurality of thin metal wires electrically insulated from the first conductive portion,
wherein the first conductive portion has a plurality of wiring patterns of the first conductive portion arranged in one direction and connected to a plurality of first sensing portions respectively,
the first dummy electrode portion has a plurality of first dummy wiring patterns each arranged in a gap between adjacent wiring patterns of the first conductive portion, and
a wiring density of the first dummy wiring patterns is equal to a wiring density of the wiring patterns of the first conductive portion.

8. The conductive film according to claim 1, wherein the conductive portion is formed on one surface of the transparent substrate.

9. A display device comprising:
a display unit that has a pixel array pattern;
a backlight unit that has at least one prism sheet in which parallel microprism arrays having a minute triangular cross-sectional shape are formed; and
the conductive film according to claim 1.

10. A touch panel comprising:
the conductive film according to claim 1; and
a detection control portion that detects a contact position or a proximity position from the one surface side of the conductive film.

11. A display device comprising:
a display unit that has a pixel array pattern and displays an image on a display screen based on a display signal;
a backlight unit that has at least one prism sheet in which parallel microprism arrays having a minute triangular cross-sectional shape are formed; and
the touch panel according to claim 10,
wherein the conductive film of the touch panel is disposed on the display screen, in a state in which the another surface side thereof faces the display unit.

12. A wiring pattern determination method for a conductive film that is installed on a display unit of a display device including the display unit having a pixel array pattern and a backlight unit having at least one prism sheet, in which parallel microprism arrays having a minute triangular cross-sectional shape are formed, and that has a wiring pattern in which a plurality of openings formed by a plurality of thin metal wires are arranged in a form of mesh, the method comprising steps of:
obtaining transmittance image data of the wiring pattern and transmittance image data of a pattern of the microprism arrays;
calculating peak spatial frequencies of a plurality of spectrum peaks of two-dimensional Fourier spectra of the transmittance image data of the wiring pattern and peak spatial frequencies of spectrum peaks up to a second-order term of two-dimensional Fourier spectra of the transmittance image data of the pattern of the microprism arrays, by performing two-dimensional Fourier transform on the transmittance image data of the wiring pattern and the transmittance image data of the pattern of the microprism arrays;
calculating a difference between the calculated plurality of peak frequencies of the wiring pattern and the calculated peak frequencies up to the second-order term of the pattern of the microprism arrays for each combination of the peak frequencies; and
comparing the obtained difference in the peak frequency between the wiring pattern and the pattern of the microprism arrays with 3 cycles/mm,
wherein when the difference of the peak frequency calculated for all combinations is greater than 3 cycles/mm, the wiring pattern is set to be a wiring pattern of the conductive film; and when the difference of the peak frequency is equal to or less than 3 cycles/mm, the transmittance image data of the wiring pattern is updated to transmittance image data of a new wiring pattern, the step of calculating the peak frequencies, the step of calculating the difference of the peak frequency, and the step of comparing the difference of the peak frequency with 3 cycles/mm are repeated until the difference of the peak frequency of all combinations becomes greater than 3 cycles/mm, whereby the wiring pattern is optimized with respect to second moires occurring due to interference among three patterns including the wiring pattern, the pixel array pattern of the display unit, and the pattern of the microprism arrays of the prism sheet.

13. A wiring pattern determination method for a conductive film that is installed on a display unit of a display device including the display unit having a pixel array pattern and a backlight unit having at least one prism sheet, in which parallel microprism arrays having a minute triangular cross-sectional shape are formed, and that has a wiring pattern in which a plurality of openings formed by a plurality of thin metal wires are arranged in a form of mesh, the method comprising steps of:
obtaining transmittance image data of the wiring pattern, transmittance image data of the pixel array pattern of the display unit on which the wiring pattern is superimposed, and transmittance image data of a pattern of the microprism arrays of the display unit;

calculating peak spatial frequencies of a plurality of spectrum peaks of two-dimensional Fourier spectra of the transmittance image data of the wiring pattern, peak spatial frequencies of a plurality of spectrum peaks of two-dimensional Fourier spectra of the transmittance image data of the pixel array pattern, and peak spatial frequencies of spectrum peaks up to a second-order term of two-dimensional Fourier spectra of the transmittance image data of the pattern of the microprism arrays, by performing two-dimensional Fourier transform on the transmittance image data of the wiring pattern, the transmittance image data of the pixel array pattern, and the transmittance image data of the pattern of the microprism arrays;

calculating frequencies of third moires from the calculated plurality of peak spatial frequencies of the pixel array patterns and the calculated plurality of peak frequencies of the wiring pattern;

determining peak frequencies of the third moires from the calculated frequencies of the third moires occurring due to interference between the wiring pattern and the pixel array pattern;

calculating frequencies of second moires occurring due to interference among three patterns including the wiring pattern, the pixel array pattern, and the pattern of the microprism arrays, by calculating a difference between the determined peak frequencies of the third moires and the calculated peak frequencies up to the second-order term of the pattern of the microprism arrays for each combination of the peak frequencies;

determining a lowest frequency of visually recognized second moires from the calculated plurality of frequencies of the second moires and determining a lowest frequency of visually recognized third moires from the plurality of frequencies of the third moires calculated in the aforementioned step; and comparing the determined lowest frequency of the second moires with the lowest frequency of the third moires, wherein when the lowest frequency of the second moires is higher than the lowest frequency of the third moires, the wiring pattern is set to be a wiring pattern of the conductive film; and when the lowest frequency of the second moires is equal to or lower than the lowest frequency of the third moires, the respective steps described above are repeated until the lowest frequency of the second moires becomes higher than the lowest frequency of the third moires; whereby the wiring pattern is optimized with respect to the second moires occurring due to interference among three patterns including the wiring pattern, the pixel array pattern of the display unit, and the pattern of the microprism arrays of the prism sheet.

* * * * *